United States Patent
Silverstein et al.

(10) Patent No.: US 9,340,654 B2
(45) Date of Patent: May 17, 2016

(54) SHAPE-MEMORY STRUCTURES

(71) Applicant: Technion Research & Development Foundation Limited, Haifa (IL)

(72) Inventors: Michael S. Silverstein, Zikhron-Yaakov (IL); Inna Gurevitch, Berkeley, CA (US); Christine Warwar, Nazareth (IL)

(73) Assignee: Technion Research & Development Foundation Limited, Haifa (IL)

( * ) Notice: Subject to any disclaimer, the term of this patent is extended or adjusted under 35 U.S.C. 154(b) by 0 days.

(21) Appl. No.: 14/578,519

(22) Filed: Dec. 22, 2014

(65) Prior Publication Data

US 2015/0166753 A1 Jun. 18, 2015

Related U.S. Application Data

(62) Division of application No. 13/892,606, filed on May 13, 2013, now Pat. No. 8,921,435.

(60) Provisional application No. 61/646,537, filed on May 14, 2012.

(51) Int. Cl.
*C08K 3/30* (2006.01)
*C08J 9/00* (2006.01)
*C08J 9/28* (2006.01)

(52) U.S. Cl.
CPC .............. *C08J 9/0023* (2013.01); *C08J 9/0066* (2013.01); *C08J 9/283* (2013.01); *C08K 3/30* (2013.01); *C08J 2201/028* (2013.01); *C08J 2205/052* (2013.01); *C08J 2333/06* (2013.01); *C08J 2333/08* (2013.01); *C08J 2333/10* (2013.01)

(58) Field of Classification Search
CPC .......... C08K 3/30; C08J 9/0066; C08J 9/283; C08J 9/0023; C08J 2333/10; C08J 2333/06; C08J 2333/08; C08J 2205/052; C08J 9/00; C08L 2201/12; C08L 2203/02
See application file for complete search history.

(56) References Cited

U.S. PATENT DOCUMENTS 7,967,367 B2 6/2011 Cafeo et al.
2013/0324627 A1 12/2013 Silverstein et al.

OTHER PUBLICATIONS

Official Action Dated May 13, 2014 From the US Patent and Trademark Office Re. U.S. Appl. No. 13/892,606.
Restriction Official Action Dated Feb. 12, 2014 From the US Patent and Trademark Office Re. U.S. Appl. No. 13/892,606.
Chung et al. "The Thermoresponsive Shape Memory Characteristics of Polyurethane Foam", Journal of Applied Polymer Science, 117: 2265-2271, 2010.
Tobushi et al. "The Influence of Shape-Holding Conditions on Shape Recovery of Polyurethane-Shape Memory Polymer Foams", Smart Materials and Structures, 13: 881-887, 2005.
Yakacki et al. "Strong, Tailored, Biocompatible Shape-Memory Polymer Networks", Advanced Functional Materials, 18(16): 2428-2435, Aug. 22, 2008.

*Primary Examiner* — Nathan M Nutter

(57) ABSTRACT

Polymeric foams and elastomer/hydrogel bicontinuous composite structures derived from high internal phase emulsions and possessing shape-memory characteristics are disclosed, as well as processes for forming the same and uses thereof in, for example, manufacturing of various articles.

15 Claims, 22 Drawing Sheets

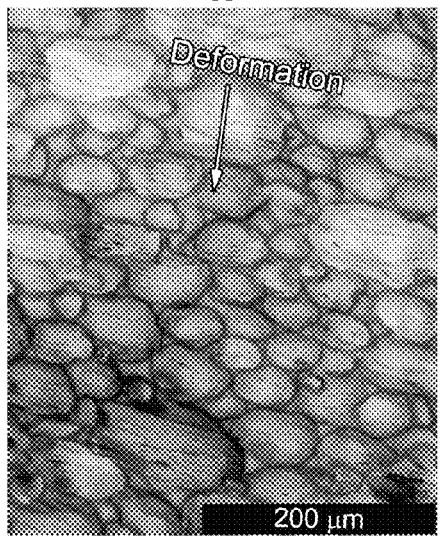
FIG.11A
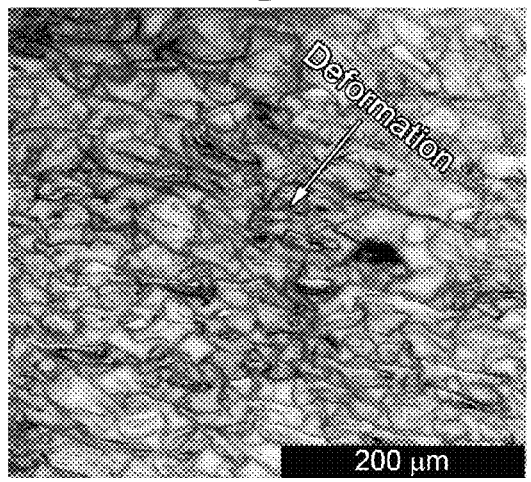
FIG.11B
FIG. 12
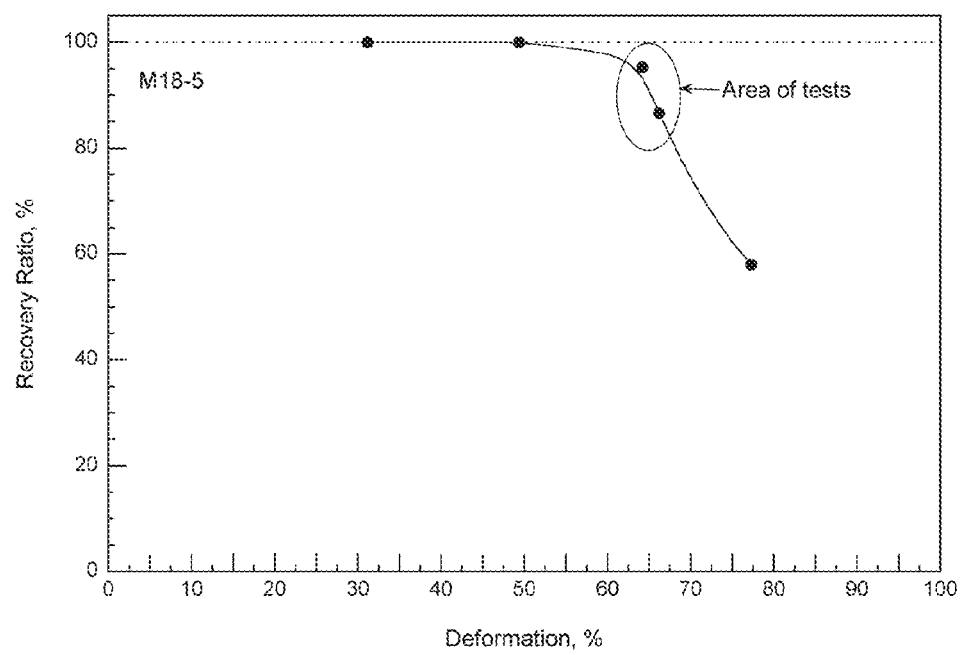

SHAPE-MEMORY STRUCTURES

RELATED APPLICATIONS

This application is a division of U.S. patent application Ser. No. 13/892,606 filed on May 13, 2013, which claims the benefit of priority under 35 USC §119(e) of U.S. Provisional Patent Application No. 61/646,537 filed on May 14, 2012, the contents of which are incorporated herein by reference in their entirety.

FIELD AND BACKGROUND OF THE INVENTION

The present invention, in some embodiments thereof, relates to polymeric material science and, more particularly, but not exclusively, to novel HIPE-derived shape-memory polymeric materials.

Smart materials constitute a class of substances exhibiting a change when exposed to an external stimulus. The change can be effected in a controlled and sometimes reversible fashion. The external stimuli can be physical or chemical and can include, for example, temperature, stress, moisture, pH, electric fields, and magnetic fields. A sub-class of smart materials includes shape memory alloys and polymers. Shape memory polymers (hereinafter SMPs) are polymeric smart materials that have the ability to return from a temporary deformed shape to their original shape, when the deforming stress has been ceased and the polymer has been exposed to an external trigger (stimulus), such as a temperature change. Deformation can be, for example, compression, corrugation, bending or folding. After a typical SMP undergoes deformation, it "remembers" its original shape when the deforming stress is removed and the recovery-triggering stimulus is activated (e.g., when a temperature change activates its "memory").

Shape-memory polymers are useful in numerous applications spanning various areas of everyday life, such as, for example, smart fabrics, heat-shrinkable tubes for electronics or films for packaging, self-deployable sun sails in spacecraft, self-disassembling mobile-phones, and intelligent medical devices and implants for minimally invasive surgery.

SMPs have generated substantial interest for biomedical applications as they offer the ability to promote minimal-incision invasive surgery, provide structural support, exert stabilizing forces, elute therapeutic agents, and possibly biodegrade. In general, polymeric medical devices can be engineered to elicit a shape-memory effect, triggered by temperature, pH, humidity, light, electric or other stimuli of facilitating molecular motion and enabling shape recovery. SMPs bear most of their promise in their potential to provide compacted medical devices for minimally invasive surgery, which could be passed through a smaller incision in their temporary folded/shrunk shape and be deployed to their full original shape once inside the body [Yakacki C. M. et al., *Adv Polym Sci*, 2010, 226, 147-175].

Tobushi, H. et al. [*Smart Materials & Structures*, 2004, 13, 881-887] disclose shape-memory polyurethane foams whose recovery temperature is based on their glass transition temperature (Tg) ranging between 50 and 60° C., and having foam densities about 0.07 grams per centimeter cubed.

U.S. Pat. Nos. 5,049,591 and 6,583,194 teach shape-memory polyurethane foams which take on a deformed shape and an as-molded shape interchangeably at a temperature higher than the glass transition temperature (Tg) thereof.

U.S. Pat. No. 6,817,441 teaches a shape memory foam member which is compressible with heating; cooled with keeping the shape memory foam member in the compressed state; and released from the compressive pressure on the shape memory foam member after cooling, substantially recovering its original shape by heating.

U.S. Patent Application having Publication No. 2009/0149617 teaches shape memory polymer (SMP) networks formed using acrylate-based monomers comprising monofunctional acrylates which are controllably crosslinked using a crosslinker such as poly(ethylene glycol dimethacrylate) (PEGDMA).

U.S. Pat. No. 7,795,350 teaches shape memory polymeric materials having a glass transition temperature, Tg, exceeding room temperature and exhibiting a rubbery modulus and elasticity derived substantially from physical crosslinks. These materials are prepared by blending components including one crystalline polymer and two amorphous polymers.

The shape-memory effect is not an intrinsic property, meaning that polymers do not display this effect by themselves. Shape-memory results from a combination of polymer chemistry, polymer morphology, and specific processing and can be referred to as imbuing polymer with functionality. By conventional processing, e.g. templating, extruding and injection molding, the polymer is formed into its initial, permanent shape. Afterwards, in a process called programming, the polymer sample is deformed and fixed into the temporary shape. Upon application of an external stimulus, the polymer recovers its initial, permanent shape.

One aspect in polymer functionalization relating to shape-memory is crystallinity. As is widely known in the art, polymers are composed of long molecular chains which form irregular, entangled coils in the melt. Some polymers may retain such a disordered structure upon cooling, and thus convert into amorphous solids, while in other polymers, the backbone chains rearrange upon cooling and form partly ordered regions, referred to herein as crystalline regions. Polymers that can form crystalline or semi-crystalline regions upon cooling from the melt are referred to as "crystalline polymers" or "semi-crystalline polymers".

Polymer crystallinity can play an important role in the shape-memory phenomena, wherein melting and freezing of the crystalline regions serve as molecular switches between the different shape states. The transition point is governed by the melting temperature, and heat serves as a stimulus.

FIG. 1A presents an illustration of the cycle of programming and recovery of a shape-memory polymer having a semi-crystalline morphology in at least the deformed shape. This cycle can be repeated several times, with different temporary shapes in any subsequent cycle. As can be seen in FIG. 1A, net-points, represented by black dots, which determine the permanent shape of the polymer network and can be of a chemical (covalent bonds) or physical (intermolecular interactions) nature, and crystalline backbone chain regions, represented by parallel lines, serve as molecular switches.

Shape-memory polyurethane foams whose recovery temperature is based on Tm of about 30° C., manufactured by the salt leaching method, having a cell size range of 400 to 1000 μm and a density of about 0.11 grams per centimeter cubed have been prepared and characterized previously [Chung, S. et al. *Journal of Applied Polymer Science*, 2010, 117, 2265-2271].

Crystallinity can also be conferred by side-chain moieties, as oppose to, or combined with, backbone chain crystallinity, as employed in other polymeric applications, such as disclosed in U.S. Pat. No. 3,853,778. Side-chain crystallinity has also been employed in shape-memory polymers, as disclosed for example in U.S. Pat. No. 5,888,650.

FIG. 1B presents an illustration of the melt-freeze cycle of a polymer having a semi-crystalline morphology conferred by side-chain moieties.

One particular polymer templating, relating to a processing alternative in imbuing polymer functionality, is known as solution or emulsion templating, as achieved in polymerization within some emulsions. Such processes are disclosed in, for example, U.S. Pat. No. 7,053,131.

High internal phase emulsions (HIPEs) are typically formed from two immiscible liquids, typically being water as a major dispersed or internal phase, and a highly hydrophobic liquid as a minor continuous or external phase, in the presence of a surfactant which is insoluble in the internal phase. The amount of surfactant needed to stabilize a major phase dispersed within a minor phase may reach up to 30% of the weight of the minor phase. HIPEs can also be stabilized through the formation of Pickering emulsions, as described below.

PolyHIPEs are highly porous polymers synthesized by polymerization of monomers within the external phase of HIPEs with internal phase volumes that are typically greater than 74% by volume of the emulsion. Most polyHIPEs are based on the co-polymerization of hydrophobic monomers and crosslinking co-monomers within the continuous phase of water-in-oil (w/o) HIPEs, followed by the removal of the internal phase, thereby producing a porous air-filled polymer.

A variety of polyHIPEs and polyHIPE-based materials have been synthesized and reported in the art. The porous morphology and properties of a polyHIPE was found to depend, among other factors, on the type and amount of the HIPE-stabilizing amphiphilic surfactant.

High internal phase emulsions stabilized by surfactants and polyHIPEs made therefrom are disclosed, for example, in U.S. Pat. No. 6,147,131, which teaches porous polymeric materials (foams) made from HIPEs which include water-in-oil high internal phase emulsions having at least 70% of an internal aqueous phase and less than 30% of an external oil phase, wherein the oil phase comprises a vinyl polymerizable monomer and a surfactant effective to stabilize the emulsion, and wherein the surfactants are oil soluble and include an oxyalkylene component.

Surfactant-based polyHIPEs are disclosed in, e.g., U.S. Pat. No. 3,988,508. Typically, the surfactants which are used in polyHIPEs are difficult and/or costly to remove. This disadvantage is more acute for polyHIPEs where unusually large quantities of surfactant are needed, hence displacing/replacing the surfactants in HIPEs can prove advantageous, especially for polyHIPE syntheses.

PolyHIPEs based on long side-chain acrylic monomers using divinylbenzene containing divinylbenzene (DVB) or ethylene glycol dimethacrylate (EGDMA) as comonomer crosslinking agents have been reported [Livshin, S. et al., *Macromolecules* 2007, 40, 6349-6354; and *Macromolecules* 2008, 41, 3930-3938], wherein the comonomer crosslinking agent was mixed with the other monomers in the polymerization reaction to afford a crosslinked copolymer. It would be expected that such polymers would possess some shape-memory due to the crystallizable side-chain moieties, however, these polyHIPEs were not reported as exhibiting any significant shape-memory attributes, probably due to the fact that copolymerization and crosslinking using a comonomer reduces crystallinity of the long side-chain moieties significantly, essentially by restricting the movement of the backbone chains as well as the side-chains [Livshin, S. et al., *Soft Matter*, 2008, 4, 1630-1638].

A Pickering emulsion (named after S. U. Pickering who first described the phenomenon in 1907) is a surfactant-free emulsion stabilized by micro- or nano-scaled solid particles that preferentially migrate to the interface between the two liquid phases. The aforementioned standard amphiphilic surfactants reduce the oil-water interfacial tension. The solid particles of a Pickering emulsion form rigid shells that surround polyhedral or spheroidal droplets of the dispersed phase and prevent coalescence thereof. The particles' shape and size, inter-particle interactions, and the wetting properties of the particles with respect to the liquid phases affect its ability to stabilize HIPEs. The stability of Pickering emulsions based on inorganic particles can be enhanced by chemically modifying the particles' surface with organic moieties that increase their tendency to migrate to the interface, and determines their ability to stabilize oil-in-water (o/w) or water-in-oil (w/o) emulsions.

Several different chemical surface modification methodologies, including silane modification, have been used to change the hydrophilic nature of the surface of silica nanoparticles such that they are able to stabilize Pickering emulsions. Silane coupling agents are commonly used to enhance fiber/matrix adhesion in polymer composites. Alkoxysilanes and chlorosilanes contain groups that bind covalently with silica through reaction with the hydroxyl groups on its surface. These silanes also contain hydrophobic organic groups that decrease surface hydrophilicity. Silane-modification thus enhances the amphiphilic character of the particles' surface, making it more suitable for Pickering emulsions and the corresponding HIPE stabilization. The extent of silica surface reaction with methyldichlorosilane was demonstrated to affect the degree of hydrophobicity and to determine whether it would stabilize an o/w or a w/o Pickering emulsion. In addition to controlling surface hydrophobicity, a silane that bears a vinyl group as part of the chemical surface modification can act as a monomer during a co-polymerization reaction.

Pickering HIPEs containing up to 92% internal phase, stabilized with 1-5% by weight of either titania or silica nanoparticles, whose surfaces were modified with oleic acid, have been reported [Menner, A. et al., *Chemical Communications*, 2007, 4274-4276; and Ikem, V. O. et al., *Angewandte Chemie International Edition*, 2008, 47, 8277-8279]. Similarly, partially oxidized carbon nanotubes were used to stabilize HIPEs containing up to 60% internal phase [Menner, A. et al., *Langmuir*, 2007, 23, 2398-2403] and poly(methyl methacrylate) microgel particles were used to stabilize HIPEs containing 50% internal phase [Colver, P. J.; Bon, S. A. F., *Chemistry of Materials*, 2007, 19, 1537-1539].

U.S. Pat. No. 6,353,037 discloses foams containing functionalized metal-oxide nanoparticles and methods of making the same.

Thus, the advantages of using Pickering HIPEs with a relatively small amount of nanoparticles for forming polyHIPEs include eliminating the need for standard surfactants, eliminating the need for procedures to remove such surfactants, and eliminating the problems associated with residual and leachable surfactants. Most of the polyHIPEs synthesized from such Pickering HIPEs exhibited relatively large voids (300 to 400 μm in diameter). Smaller voids of about 50 μm in diameter were observed when poly(styrene/methyl methacrylate/acrylic acid) particles were used to stabilize Pickering HIPE [Zhang, S.; Chen, J., *Chemical Communications*, 2009, 2217-2219]. PolyHIPEs from Pickering HIPEs do not usually exhibit the highly interconnected porous structures typical of conventional polyHIPEs but, rather, exhibit a somewhat interconnected structure.

SUMMARY OF THE INVENTION

The present have now devised and successfully prepared and practiced novel HIPE-derived shape-memory polymeric foam compositions. The shape-memory polymeric foam compositions are characterized by a transition temperature that is conferred by crystallizable side-chain moieties which are made free for forming crystalline regions by virtue of their backbone chains being crosslinked substantially at the solid-gas interface rather than within the bulk of the polymer. Being HIPE-derived, the shape-memory polymeric foam compositions have a microstructure of a polyHIPE, as well as highly notable shape-memory characteristics.

The present inventors have further devised and successfully prepared and practiced novel shape-memory bicontinuous composite structures (SM-BCSs) composed of a continuous polymeric porous solid matrix and a continuous hydrogel filling the pores in the solid matrix.

According to an aspect of some embodiments of the present invention there is provided a shape-memory polymeric foam composition that includes a polymeric porous solid matrix composed of a plurality of backbone chains, wherein at least a portion of the backbone chains includes a plurality of side-chain moieties; the backbone chains are arranged such that the side-chain moieties are capable of forming a crystalline structure, and wherein at least a portion of the backbone chains are crosslinked substantially at a solid-gas interface of the polymeric foam composition.

According to some embodiments of the invention, when the composition is deformed by an external stress at a temperature above its melting temperature (Tm) and the temperature is then lowered below the Tm while maintaining the stress, the composition substantially retains its deformed shape. According to further embodiments, when the stress is ceased and the temperature is then raised above the Tm, the composition substantially recovers to its original shape.

According to some embodiments of the invention, at least a portion of the side-chain moieties form the crystalline structure below the Tm.

According to some embodiments of the invention, the backbone chains essentially do not non-crosslinked within the bulk of the porous solid matrix.

According to some embodiments of the invention, the composition is characterized by a gel content greater than 85 percent.

According to some embodiments of the invention, the backbone chains are substantially amorphous at any temperature.

According to some embodiments of the invention, the Tm of the composition ranges from 20° C. to 90° C.

According to some embodiments of the invention, the elastic modulus that ranges from 0.1 to 10 MPa at a first temperature and a elastic modulus that ranges from 1 to 100 kPa at a second temperature, wherein the first temperature is lower than the Tm and the second temperature is higher than the Tm.

According to some embodiments of the invention, the first temperature ranges from 0° C. to 10° C. and the second temperature ranges from 60° C. to 90° C.

According to some embodiments of the invention, the composition presented herein is characterized by a shape recovery ratio higher than 80 percent.

According to some embodiments of the invention, the composition presented herein is characterized by a shape fixity ratio higher than 90 percent.

According to some embodiments of the invention, each of the elastic modulus, shape recovery ratio and shape fixity ratio is independently consistent within 10 percent of an average value obtained in a number of repetitive test cycles ranging from 2-10.

According to some embodiments of the invention, the composition presented herein has a degree of crystallinity (Xc) at a temperature lower than the Tm that ranges from 30 to 60 percent.

According to some embodiments of the invention, the composition presented herein has a density ($\rho$) that ranges from 0.05 to 0.3 grams per centimeter cubed.

According to some embodiments of the invention, each of the side-chain moieties is independently selected from the group consisting of $C_{10-30}$ moieties, aromatic moieties, hydrogen-bond forming moieties and polar moieties.

According to some embodiments of the invention, each of the side-chain moieties is independently a $C_{10-30}$ side-chain moiety.

According to some embodiments of the invention, $C_{10-30}$ side-chain moieties are selected from the group consisting of decanyl ($C_{10}$), undecyl ($C_{11}$), lauryl ($C_{12}$), tridecanyl ($C_{13}$), myristyl ($C_{14}$), pentadecanoyl ($C_{15}$), palmitoleyl ($C_{16}$), palmityl ($C_{16}$), heptadecanyl ($C_{17}$), stearyl ($C_{18}$), linoleyl ($C_{18}$), oleyl ($C_{18}$), nonadecanyl ($C_{19}$) icosanyl ($C_{20}$), docosanyl ($C_{22}$) and any mixtures thereof.

According to some embodiments of the invention, each of the backbone chains is independently characterized by a tacticity selected from the group consisting of atactic, isotactic, syndiotactic and any combination thereof.

According to some embodiments of the invention, each of the backbone chains is independently selected from the group consisting of polyacrylate backbone chains, polymethacrylate backbone chains, polyethylene backbone chains, polyurethane backbone chains, polyamide backbone chains, polyester backbone chains, polysiloxane backbone chains, polyether backbone chains and polyaryl backbone chains.

According to some embodiments of the invention, each of the backbone chains is polyacrylate backbone chains and/or polymethacrylate backbone chains.

According to some embodiments of the invention, the composition presented has a microstructure based on the external phase of an emulsion.

According to some embodiments of the invention, the microstructure is a quasi-closed-cell microstructure.

According to some embodiments of the invention, the average cell diameter in the quasi-closed-cell microstructure ranges from 1 μm to 500 μm.

According to some embodiments of the invention, the composition presented herein is produced by subjecting a high internal phase emulsion (HIPE) having an internal phase and a polymerizable external phase to polymerization of the polymerizable external phase.

According to some embodiments of the invention, the internal phase of the HIPE used to produce the composition presented herein, further includes a hydrophilic monomer, a hydrophilic crosslinking agent and a hydrophilic initiator agent.

According to an aspect of some embodiments of the present invention, there is provided a shape-memory bicontinuous composite structure (SM-BCS) which includes a continuous polymeric porous solid matrix composed of a plurality of backbone chains and a continuous hydrogel filling the pores in the continuous polymeric porous solid matrix, wherein at least a portion of the backbone chains exhibits a plurality of side-chain moieties which is arranged such that the plurality of side-chain moieties is capable of forming a crystalline structure, and wherein at least a portion of the backbone chains are crosslinked substantially at the matrix-hydrogel interface of the structure.

According to some embodiments of the SM-BCS of the present invention, the structure is such that when the hydrogel in the SM-BCS is hydrated and the structure is deformed by an external stress at a temperature above the melting temperature (Tm) of the matrix, and the temperature is then lowered below the Tm while maintaining the stress, the structure substantially retains its deformed shape. According to further embodiments, when the stress is ceased and the temperature is then raised above the Tm, the structure substantially recovers to its original shape.

According to some embodiments of the SM-BCS of the present invention, at least a portion of the side-chain moieties form the crystalline structure below the Tm.

According to some embodiments of the SM-BCS of the present invention, the plurality of backbone chains is essentially non-crosslinked within the bulk of the porous solid matrix.

According to some embodiments of the SM-BCS of the present invention, the plurality of backbone chains is substantially amorphous at any temperature.

According to some embodiments of the SM-BCS of the present invention, the Tm ranges from 20° C. to 90° C.

According to some embodiments of the SM-BCS of the present invention, the structure has an elastic modulus that ranges from 0.1 to 10 MPa at a first temperature and a elastic modulus that ranges from 1 to 100 kPa at a second temperature, wherein the first temperature is lower than the Tm and the second temperature is higher than the Tm.

According to some embodiments of the SM-BCS of the present invention, the first temperature ranges from 0° C. to 10° C. and the second temperature ranges from 60° C. to 90° C.

According to some embodiments of the SM-BCS of the present invention, the structure is characterized by a shape recovery ratio higher than 70 percent.

According to some embodiments of the SM-BCS of the present invention, the structure is characterized by a shape fixity ratio higher than 90 percent.

According to some embodiments of the SM-BCS of the present invention, the structure has a degree of crystallinity (Xc) at a temperature lower than the Tm that ranges from 30 to 60 percent.

According to some embodiments of the SM-BCS of the present invention, the structure has a density ($\rho$) that ranges from 0.05 to 1 grams per centimeter cubed.

According to some embodiments of the SM-BCS of the present invention, each of the side-chain moieties is independently selected from the group consisting of $C_{10-30}$ moieties, aromatic moieties, hydrogen-bond forming moieties and polar moieties.

According to some embodiments of the SM-BCS of the present invention, each of the side-chain moieties is independently a $C_{10-30}$ side-chain moiety.

According to some embodiments of the SM-BCS of the present invention, the $C_{10-30}$ side-chain moiety is selected from the group consisting of decanyl ($C_{10}$), undecyl ($C_{11}$), lauryl ($C_{12}$), tridecanyl ($C_{13}$), myristyl ($C_{14}$), pentadecanoyl ($C_{15}$), palmitoleyl ($C_{16}$), palmityl ($C_{16}$), heptadecanyl ($C_{17}$), stearyl ($C_{18}$), linoleyl ($C_{18}$), oleyl ($C_{18}$), nonadecanyl ($C_{19}$), icosanyl ($C_{20}$), docosayl ($C_{22}$) and any mixtures thereof.

According to some embodiments of the SM-BCS of the present invention, each of the backbone chains is independently characterized by a tacticity selected from the group consisting of atactic, isotactic, syndiotactic and any combination thereof.

According to some embodiments of the SM-BCS of the present invention, each of the backbone chains is independently selected from the group consisting of polyacrylate backbone chains, polymethacrylate backbone chains, polyethylene backbone chains, polyurethane backbone chains, polyamide backbone chains, polyester backbone chains, polysiloxane backbone chains, polyether backbone chains and polyaryl backbone chains.

According to some embodiments of the SM-BCS of the present invention, each of the backbone chains is polyacrylate backbone chains and/or polymethacrylate backbone chains.

According to some embodiments of the SM-BCS of the present invention, the structure has a microstructure based on the external phase of an emulsion.

According to some embodiments of the SM-BCS of the present invention, the microstructure is a quasi-closed-cell microstructure.

According to some embodiments of the SM-BCS of the present invention, an average cell diameter in the quasi-closed-cell microstructure ranges from 1 μm to 500 μm.

According to some embodiments of the SM-BCS of the present invention, the structure is produced by subjecting a high internal phase emulsion (HIPE) having a polymerizable external phase and a jellifiable internal phase to polymerization of the external phase and jellification of the internal phase.

According to some embodiments of the SM-BCS of the present invention, the internal phase includes a hydrophilic monomer, a hydrophilic crosslinking agent and a water-soluble initiator agent.

According to some embodiments of the SM-BCS of the present invention, the hydrogel is afforded by the jellification.

According to an aspect of some embodiments of the present invention, there is provided a process of preparing a shape-memory polymeric foam composition, as described herein, the process includes subjecting a high internal phase emulsion (HIPE) having an internal aqueous phase and an organic polymerizable external phase to polymerization and crosslinking of the polymerizable external phase, the organic polymerizable external phase includes at least one monomer having a crystallizable side-chain moiety and capable of being polymerized into a plurality of backbone chains, wherein at least a portion of the backbone chains is arranged such that the plurality of side-chain moieties is capable of forming a crystalline structure, the polymerization being initiated substantially in a bulk of the polymerizable external phase and the crosslinking is effected substantially at an interface between the polymerizable external phase and the internal phase.

According to some embodiments of the invention, process further includes, subsequent to the subjecting, removing the internal aqueous phase.

According to some embodiments of the invention, at least a portion of the backbone chains are crosslinked substantially at the solid-gas interface of the shape-memory polymeric foam composition, and the plurality of backbone chains is arranged such that the plurality of crystallizable side-chain moieties is capable of forming a crystalline structure.

According to some embodiments of the invention, the aqueous internal phase and/or the organic polymerizable external phase includes an amphiphilic emulsion stabilizer and crosslinking agent capable of crosslinking the portion of the backbone chains.

According to some embodiments of the invention, the aqueous internal phase and/or the organic polymerizable external phase includes an emulsion stabilizer selected from the group consisting of a surfactant, a plurality of modified or unmodified particles or nanoparticles, a plurality of modified or unmodified metal oxide or semi-metal oxide particles or nanoparticles, a plurality of modified or unmodified silica particles or nanoparticles, a plurality of modified or unmodified titania particles or nanoparticles, a plurality of modified or unmodified zirconia particles or nanoparticles, a plurality of modified or unmodified alumina particles or nanoparticles, a plurality of modified or unmodified carbon black particles or nanoparticles, a plurality of modified carbon nanotubes, and any combination thereof.

According to some embodiments of the invention, the emulsion stabilizer is in the form of a plurality of modified particles or nanoparticles having a plurality of polymerizable moieties attached thereon.

According to some embodiments of the invention, the plurality of modified particles or nanoparticles is a plurality of modified metal oxide or semi-metal oxide nanoparticles and the plurality of polymerizable moieties includes an alkoxysilane.

According to some embodiments of the invention, the alkoxysilane is selected from the group consisting of 3-(methacryloxy)propyltrimethoxysilane, 3-(acryloxy)propyltrimethoxysilane, vinyltrimethoxysilane, styrylethyltrimethoxysilane, 3-(methacryloxy)propylmethyldimethoxysilane, and 3-(n -allylamino)propyltrimethoxysilane.

According to some embodiments of the invention, the plurality of modified metal oxide or semi-metal oxide nanoparticles is modified in a solution having a mass ratio of the alkoxysilane to the nanoparticles that ranges from 0 to 15.

According to some embodiments of the invention, the emulsion stabilizer is a plurality of modified silica nanoparticles.

According to some embodiments of the invention, the alkoxysilane is 3-(methacryloxy)propyltrimethoxysilane.

According to some embodiments of the invention, the concentration of the modified silica nanoparticles ranges from 0.1 percent to 5 percent of the total weight of the high internal phase emulsion.

According to some embodiments of the invention, the crystallizable side-chain moiety is selected from the group consisting of $C_{10-30}$ moieties, aromatic moieties, hydrogen-bond forming moieties and polar moieties.

According to some embodiments of the invention, the crystallizable side-chain moiety is a $C_{10-30}$ side-chain moiety.

According to some embodiments of the invention, the $C_{10-30}$ side-chain moiety is selected from the group consisting of decanyl ($C_{10}$), undecyl ($C_{11}$), lauryl ($C_{12}$), tridecanyl ($C_{13}$), myristyl ($C_{14}$), pentadecanoyl ($C_{15}$), palmitoleyl ($C_{16}$), palmityl ($C_{16}$), heptadecanyl ($C_{17}$), stearyl ($C_{18}$), linoleyl ($C_{18}$), oleyl ($C_{18}$), nonadecanyl ($C_{19}$) icosanyl ($C_{20}$), docosayl ($C_{22}$) and any mixtures thereof.

According to some embodiments of the invention, the monomer is selected from the group consisting of an acrylate, a methacrylate and a diene.

According to some embodiments of the invention, the acrylate is selected from the group consisting of stearyl acrylate, stearyl methacrylate, lauryl acrylate and lauryl methacrylate.

According to some embodiments of the invention, the concentration of the monomer ranges from 5 percent to 40 percent of the total weight of the high internal phase emulsion.

According to some embodiments of the invention, the mass ratio of the organic polymerizable external phase to the aqueous internal phase in the HIPE ranges from 0.05 to 0.67.

According to some embodiments of the invention, the organic external phase further includes an organic-soluble initiator agent.

According to some embodiments of the invention, the organic-soluble initiator agent is selected from the group consisting of benzoyl peroxide (BPO), azobisisobutyronitrile (AIBN) and dicumyl peroxide (DCP).

According to some embodiments of the invention, the aqueous internal phase further includes an aqueous phase stabilization enhancer.

According to some embodiments of the invention, the aqueous phase stabilization enhancer is selected from the group consisting of potassium sulfate, calcium chloride hydrate and sodium chloride.

According to some embodiments of the invention, the high internal phase emulsion further includes a reinforcing agent, a curing agent, a curing accelerator, a catalyst, a tackifier, a plasticizer, a flame retardant, a flow control agent, a filler, organic and inorganic microspheres, organic and inorganic microparticles, organic and inorganic nanoparticles, a conducting agent, a magnetic agent, electrically conductive particles, thermally conductive particles, fibers, an antistatic agent, a antioxidant, a anticorrosion agent, a UV absorber, a colorant and combination thereof.

According to an aspect of some embodiments of the present invention, there is provided a process of preparing a shape-memory bicontinuous composite structure (SM-BCS), as described herein, which is effected by subjecting a high internal phase emulsion (HIPE) having a jellifiable internal aqueous phase and an polymerizable organic external phase to jellification of the jellifiable internal aqueous phase and polymerization and crosslinking of the polymerizable external phase, wherein the jellifiable internal aqueous phase includes at least one hydrophilic monomer, at least one hydrophilic crosslinking agent and a hydrophilic initiation agent, and the organic polymerizable external phase includes at least one hydrophobic monomer having a crystallizable side-chain moiety and capable of being polymerized into a plurality of backbone chains, and wherein at least a portion of the backbone chains is arranged such that the plurality of side-chain moieties is capable of forming a crystalline structure, the crosslinking is effected substantially at an interface between the organic external phase and the internal aqueous phase.

According to some embodiments of the process of preparing the SM-BCS of the present invention, the hydrophilic monomer is selected from the group consisting of acrylamide (AAm), acrylic acid (AAc), methacrylaic acid (MAAc), hydroxyethyl acrylate (HEA), hydroxyethyl methacrylate (HEMA), N-isopropylacrylamide (NiPAAm), and any combination thereof.

According to some embodiments of the process of preparing the SM-BCS of the present invention, the hydrophilic crosslinking agent is selected from the group consisting of N,N'-methylenebisacrylamide (MBAM), N,N'-methylenebis (2-methylacrylamide), methylene diacrylate, methylene bis (2-methylacrylate), diethylene glycol diacrylate, hexamethylene diacrylate, oxybis(methylene)bis(2-methylacrylate), oxybis(ethane-2,1-diyl)bis(2-methylacrylate) and any combination thereof.

According to some embodiments of the process of preparing the SM-BCS of the present invention, the hydrophilic initiation agent is selected from the group consisting of a persulfate salt, potassium persulfate (KPS), rongalite, a sulfite, a peroxide and a hydroperoxide.

According to some embodiments of the process of preparing the SM-BCS of the present invention, at least a portion of the backbone chains are crosslinked substantially at the HIPE's phase interface, and the plurality of backbone chains is arranged such that the plurality of crystallizable side-chain moieties is capable of forming a crystalline structure.

According to some embodiments of the process of preparing the SM-BCS of the present invention, the aqueous internal phase and/or the organic polymerizable external phase includes an amphiphilic emulsion stabilizer and crosslinking agent capable of crosslinking the portion of the backbone chains.

According to some embodiments of the process of preparing the SM-BCS of the present invention, the emulsion stabilizer is a plurality of modified particles or nanoparticles having a plurality of polymerizable moieties attached thereon.

According to some embodiments of the process of preparing the SM-BCS of the present invention, the emulsion stabilizer is a plurality of modified silica nanoparticles.

According to some embodiments of the process of preparing the SM-BCS of the present invention, the alkoxysilane is 3-(methacryloxy)propyltrimethoxysilane.

According to some embodiments of the process of preparing the SM-BCS of the present invention, the crystallizable side-chain moiety is selected from the group consisting of $C_{10\text{-}30}$ moieties, aromatic moieties, hydrogen-bond forming moieties and polar moieties.

According to some embodiments of the process of preparing the SM-BCS of the present invention, the $C_{10\text{-}30}$ side-chain moiety is selected from the group consisting of decanyl ($C_{10}$), undecyl ($C_{11}$), lauryl ($C_{12}$), tridecanyl ($C_{13}$), myristyl ($C_{14}$), pentadecanoyl ($C_{15}$), palmitoleyl ($C_{16}$), palmityl ($C_{16}$), heptadecanyl ($C_{17}$), stearyl ($C_{18}$), linoleyl ($C_{18}$), oleyl ($C_{18}$), nonadecanyl ($C_{19}$), icosanyl ($C_{20}$), docosayl ($C_{22}$) and any mixtures thereof.

According to some embodiments of the process of preparing the SM-BCS of the present invention, the hydrophobic monomer is selected from the group consisting of an acrylate, a methacrylate and a diene.

According to some embodiments of the process of preparing the SM-BCS of the present invention, the acrylate is selected from the group consisting of stearyl acrylate, stearyl methacrylate, lauryl acrylate and lauryl methacrylate.

According to some embodiments of the process of preparing the SM-BCS of the present invention, the concentration of the hydrophobic monomer ranges from 5 percent to 40 percent of the total weight of the high internal phase emulsion.

According to some embodiments of the process of preparing the SM-BCS of the present invention, the mass ratio of the organic polymerizable external phase to the jellifiable internal aqueous phase in the HIPE ranges from 0.05 to 0.67.

According to some embodiments of the process of preparing the SM-BCS of the present invention, the organic external phase further includes an organic-soluble initiator agent.

According to some embodiments of the process of preparing the SM-BCS of the present invention, the aqueous internal phase further includes an aqueous phase stabilization enhancer.

According to an aspect of some embodiments of the present invention, there is provided a shape-memory polymeric foam composition prepared by the process presented herein.

According to some embodiments of the invention, the composition presented herein is for use in forming an article-of-manufacture.

According to an aspect of some embodiments of the present invention, there is provided an article-of-manufacturing comprising the composition presented herein.

According to some embodiments of the invention, the article-of-manufacturing is selected from the group consisting of an implantable medical device, a drug-delivery system, a solid body, a fiber, a fabric, a tube, a film, a spring, a rod, a ring, a tubular mesh, a slotted tube, a coil and any combination thereof.

According to an aspect of some embodiments of the present invention, there is provided a shape-memory bicontinuous composite structure prepared by the process presented herein.

According to some embodiments of the invention, the shape-memory bicontinuous composite structure is for use in forming an article-of-manufacture.

According to an aspect of some embodiments of the present invention, there is provided an article-of-manufacturing which includes the shape-memory bicontinuous composite structure presented herein.

According to some embodiments of the invention, the article-of-manufacturing which includes the shape-memory bicontinuous composite structure presented herein is selected from the group consisting of an implantable medical device, a drug-delivery system, a solid body, a fiber, a fabric, a tube, a film, a spring, a rod, a ring, a tubular mesh, a slotted tube, a coil and any combination thereof.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying figures. With specific reference now to the figures in detail, it is stressed that the particulars shown are by way of example and for purposes of illustrative discussion of embodiments of the invention. In this regard, the description taken with the figures makes apparent to those skilled in the art how embodiments of the invention may be practiced.

In the drawings:

FIGS. 11A-B present SEM micrographs of a sample of an exemplary shape-memory polyHIPE M18-5, according to some embodiments of the present invention, heated to 70° C., deformed to either about 30 percent deformation and then cooled to room temperature (FIG. 11A) or to about 65 percent deformation and then cooled to room temperature (FIG. 11B);

FIG. 12 presents a plot of the recovery ratio as a function of deformation level as measured for an exemplary shape-memory polyHIPE M18-5, according to some embodiments of the present invention, for the first cycle of deformation and recovery;

DESCRIPTION OF SPECIFIC EMBODIMENTS OF THE INVENTION

The present invention, in some embodiments thereof, relates to polymeric material science and, more particularly, but not exclusively, to novel HIPE-derived shape-memory polymeric materials.

The principles and operation of some embodiments of the present invention may be better understood with reference to the figures and accompanying descriptions.

Before explaining at least one embodiment of the invention in detail, it is to be understood that the invention is not necessarily limited in its application to the details set forth in the following description or exemplified by the Examples. The invention is capable of other embodiments or of being practiced or carried out in various ways.

As presented hereinabove, the shape-memory effect of polymers is not an intrinsic property, but rather is a result of a chemical composition of the polymers, the morphology and macromolecular configuration of the polymers and the process of their preparation.

As further presented hereinabove, polyHIPEs constitute a group of emulsion-templated porous polymeric substances, typically foams having an open-cell, closed-cell, or a quasi-closed-cell microstructure, as these terms are discussed hereinbelow. Hitherto no shape-memory polymers produced by emulation templating have been reported.

As discussed hereinabove, polyHIPEs based on long side-chain acrylic monomers using comonomer crosslinking agents mixed with the other monomers in the polymerization reaction have been reported [Livshin, S. et al., *Macromolecules* 2007, 40, 6349-6354; and *Macromolecules* 2008, 41, 3930-3938]. These polyHIPEs were not reported as exhibiting any significant shape-memory attributes, probably due to the fact that copolymerization and crosslinking using a comonomer reduces crystallinity of the long side-chain moieties significantly, essentially by restricting the movement of the backbone chains as well as the side-chains [Livshin, S. et al., *Soft Matter,* 2008, 4, 1630-1638].

Figure 1A:
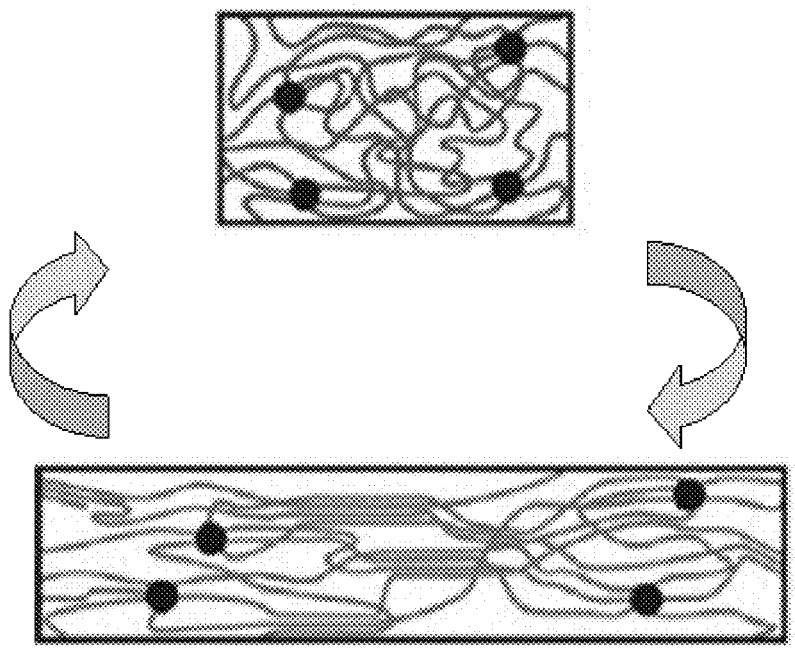
FIGS. 1A-B present background art aspects of shape-memory polymers: the cycle of programming and recovery of shape-memory polymers (FIG. 1A) and the melt-freeze cycle of crystallizable side-chain moieties (FIG. 1B)
Figure 1B:
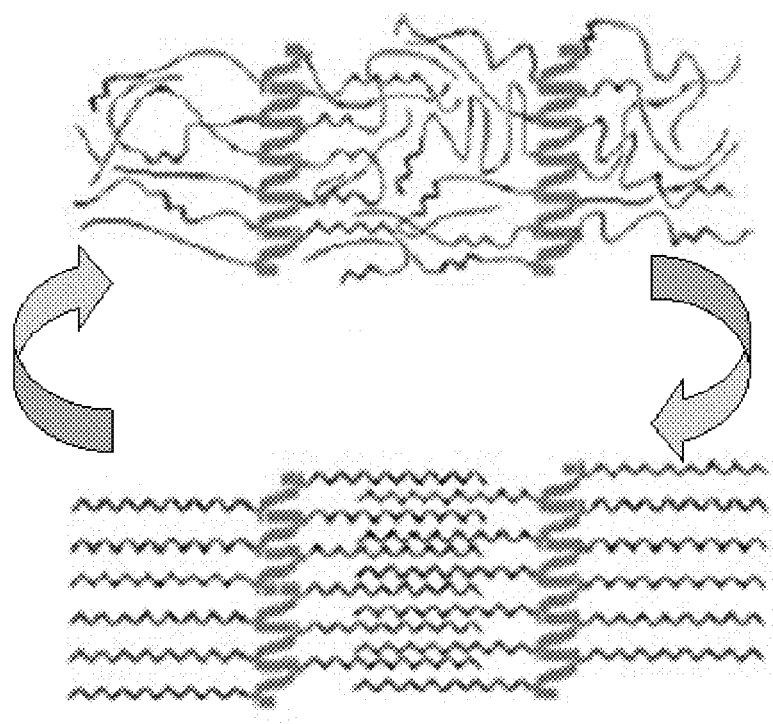
Figure 2:
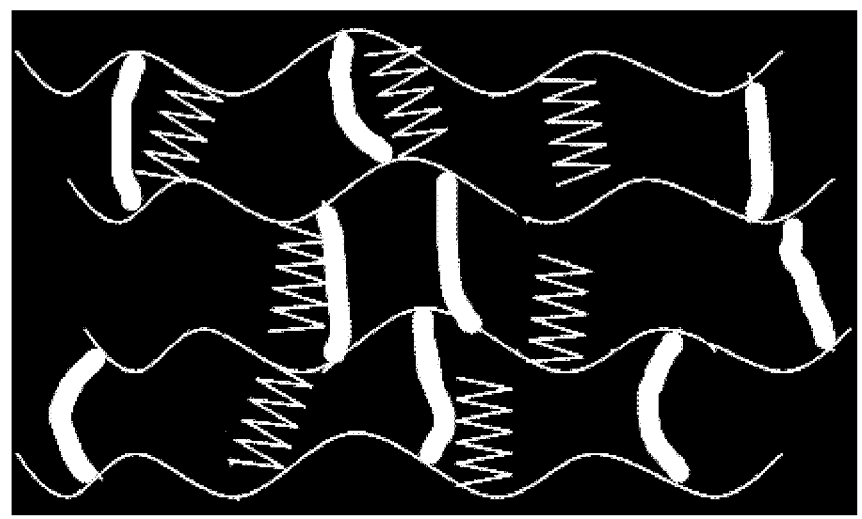
FIG. 2 presents a background art illustration of an exemplary polymeric composition comprising long side-chain moieties crosslinked by a comonomer, where the crosslinks are marked by heavy lines, the backbone chains are marked by wavy lines and the long side-chain moieties are marked by zig-zag lines.

FIG. 2 presents an illustration of a polymeric composition comprising long side-chain moieties and crosslinked by a comonomer, where the crosslinks are marked by heavy lines and the long side-chain moieties are marked by zigzag lines, as disclosed in the aforementioned art.

While exploring various aspects of Pickering HIPE polymerization, the present inventors have surprisingly found that crosslinking certain HIPE formulations, containing monomers with long crystallizable side-chain moieties, and using silane-modified nanoparticles (SM-NPs), affords shape-memory polyHIPEs.

While reducing the present invention to practice, it was found that setting the locus of polymerization initiation of monomers with long side-chain moieties in a Pickering HIPE to the bulk of the polymerizable external phase, and at the same time setting the locus of crosslinking at the interface between the polymerizable external phase and the internal phase, affords polyHIPEs with shape-memory attributes. It was hypothesized that crosslinking the formulation with SM-NPs substantially reduces the restriction of motion of the long side-chain moieties, thereby allowing the long side-chain moieties to approach a degree of crystallinity as in non-crosslinked polymers.

While further reducing the present invention to practice, it was found that the internal phase may include precursor ingredients that can form a hydrogel based on polymers such as, for example, polyacrylamide, poly(hydroxyethyl acrylate), poly(hydroxyethyl methacrylate), poly(acrylic acid) poly(methacrylic acid), and N-isopropylacrylamide (NiPAAm), to thereby afford a polyHIPE variant with shape-memory attributes wherein the voids thereof are filled with hydrogel. In such cases, the end-product is not a foam in the sense of a gas-filled spongy substance, but a bicontinuous composite structure (BCS) having a continuous hydrogel component filling the space in the quasi-closed-cell microstructure of the continuous elastomeric component.

As demonstrated in the Examples section that follows, several shape-memory polyHIPEs based on the polymerization of Pickering HIPEs were manufactured and characterized.

Hence, according to one aspect of embodiments of the present invention, there is provided a shape-memory polymeric foam composition which includes a polymeric porous solid matrix composed of a plurality of backbone chains having a plurality of side-chain moieties, wherein a portion of the backbone chains is crosslinked substantially at a solid-gas interface of the polymeric foam composition and are thus arranged such that at least some of the side-chain moieties thereon are capable of forming a crystalline structure.

In the context of embodiments of the present invention, shape-memory polymers are characterized by a transition temperature, and according to some embodiments of the present invention, the transition temperature of the polymeric foam composition presented herein is a melting temperature (Tm).

Hence, the polymeric foam composition, according to some embodiments of the present invention, is a shape-memory polymeric composition in that when the composition is deformed by an external stress at a temperature above its melting temperature (Tm) and the temperature is then lowered below the Tm while continuing to apply the deformation under stress, the composition substantially retains its deformed shape, and when the stress is removed and the temperature is then raised above the Tm, the composition substantially recovers its original shape.

The terms "deformed" and "deformation", and inflections thereof as used herein, refer to a mechanical state of a polymeric composition which can be conferred by an external force (stress).

Hence, the phrase "original shape" refers to a stable three-dimensional state (shape) of the polymeric foam composition which is essentially set at the end of the polymerization process, and related substantially to the shape in which the unpolymerized mixture was molded, and the phrase "deformed shape" refers to a temporary shape that the polymeric foam composition can take as a result of applying an external stress. According to some embodiments of the present invention, the shape-memory polymeric foam composition is a foam that can stay in a deformed shape, begotten as a result of applying an external stress thereon, until it is exposed to a temperature above its melting temperature.

The term "polymerization" refers to the reaction between monomer(s) and optionally crosslinking agent(s), as defined herein, the end of which sets the original shape of the polymeric foam composition.

The term "foam", as used herein, refers to a substance that is formed by encompassing a plurality of polydisperse or monodisperse gas bubbles, referred to herein as "cells", within a mass of a liquid or a solid, constituting the films of walls separating the cells. In the context of solid foams, according to some embodiments of the invention, the regions occupied by a tangible condensed mass are regarded as the "solid" fraction of the foam, while all other regions not occupied by this fraction are regarded as the "gas" fraction of the foam.

According to some embodiments of the present invention, the foam is a combination of a polymeric porous solid matrix and gas-filled cells, typically filled with ambient air. The phrase "porous solid matrix", as used herein, refers to the non-gaseous part of the foam, which contributes substantially to the mass of the foam but substantially less to its volume. Hence, according to some embodiments of the present invention, the polymeric foam composition presented herein is characterized by a density ($\rho$) that ranges from 0.05 to 0.3 grams per centimeter cubed.

As used herein, the phrase "solid-gas interface" refers to the boundary between the solid fraction and the gas fraction of the foam, as described hereinabove, namely surface of the porous solid matrix.

The transition temperature of the polymeric foam composition presented herein is defined substantially by the crystalline regions formed by the side-chains moieties on the backbone chains of the polymer. It is these crystalline regions that melt into a non-crystalline (amorphous) state when the temperature is raised, and therefore it is defined as the melting temperature of the polymer. The intrinsic capacity of side-chain moieties to form crystalline structures is discussed in detail hereinbelow in the context of the monomers forming the backbone chains.

According to some embodiments of the present invention, the backbone chains do not take a substantial role in forming these crystalline regions and stay essentially amorphous above and below the melting temperature. Hence, the melting temperature is associated with an attribute of the side-chain moieties.

In the context of SMPs based on backbone chain crystallinity, one of the attributes that contributes to the capacity of polymeric backbone chains to crystallize is the configuration of the polymer chain. The configuration of the polymer chain is determined by, among other things, the geometric arrangement of a monomer that is being added to the end of a growing polymer molecule with respect to the neighboring monomers. The configuration of polymer chains can affect their ability to crystallize, the crystalline structure, the degree of crystallinity, and the melting temperature. The configuration of polymer chains can be modified through changes in the polymerization reaction including the catalyst, temperature, pressure, solvent, and other additives to the reaction and to the reaction environment. Head-to-tail and head-to-head (or tail-to-tail) addition of one monomer to another also alters the polymer configuration.

The configuration of the polymer chain is also determined by tacticity (assuming head-to-tail addition). The tacticity reflects the relative stereochemistry of adjacent chiral backbone units (asymmetric centers) within polymer molecules. Isotactic polymers consist, for the most part, of monomers with identical orientations. Syndiotactic polymers consist, for the most part, of monomers with alternating opposing orientations. Atactic polymers consist of monomers with random orientations. Typically, isotactic and syndiotactic polymers provide long-range orders, which lead to higher crystallinity in the polymer chain. Atactic polymers have little order in their backbone chains and therefore tend to be amorphous. In the context of embodiments of the present invention, the backbone chains play an indirect role in forming the crystalline regions that give the composition shape-memory qualities; hence the tacticity of the backbone chain can take any form including atactic.

Hence, according to some embodiments of the present invention, each of the backbone chains in the polymeric foam composition presented herein is independently characterized by a tacticity selected from the group consisting of atactic, isotactic, syndiotactic and any combination thereof.

In the context of embodiments of the present invention, the capacity to form crystalline regions, or crystallize, is the capacity of side-chain moieties to align and/or stack over one another and form a spatially ordered region. However, since the side-chain moieties are tethered to the backbone chains, their mobility is substantially limited by the mobility of the backbone chains, and therefore the capacity of the side-chain moieties to form crystalline regions in a polymeric composition is correlated to the arrangement of the backbone chains and to the degree of freedom of the backbone chains to rearrange.

According to some embodiments of the present invention, the backbone chains in the polymeric foam composition presented herein are arranged such that the side-chain moieties are capable of forming a crystalline structure, and this arrangement is obtained by that at least a portion of the backbone chains are crosslinked substantially at a solid-gas interface of the polymeric foam composition, as opposed to being crosslinked at any other part along their span in the bulk of the solid porous matrix.

Figure 3:
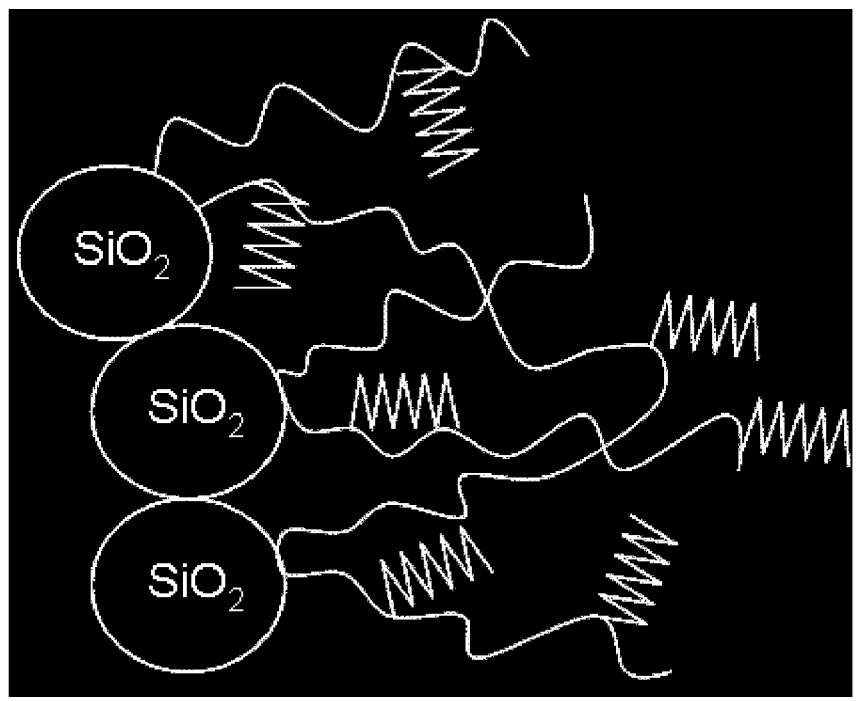
FIG. 3 presents an illustration of a polymeric composition comprising backbone chains and side-chain moieties, where the backbone chains are marked by wavy lines, the long side-chain moieties are marked by zig-zag lines and the solid-gas interface is marked by a heavy line, showing that the backbone chains are connected (crosslinked) essentially at the solid-gas interface.

FIG. 3 presents an illustration of a polymeric foam composition, according to some embodiments of the present invention, comprising backbone chains and side-chain moieties, where the backbone chains are marked by wavy lines, the long side-chain moieties are marked by zig-zag lines and the solid-gas interface is marked by a heavy line, showing that the backbone chains are connected (crosslinked) essentially at the solid-gas interface.

As can be seen in FIG. 3, the mobility of the backbone chains is not as hindered by a network of crosslinks throughout the polymer, thereby conferring a higher degree of freedom to the side-chain moieties. Considering that the configuration illustrated in FIG. 2 and the configuration illustrated in FIG. 3 can represent two polyHIPE-derived foams that share similar or identical components, such as the major part of the monomers (hence sharing similar or identical side-chain moieties) excluding the crosslinking comonomers used in configuration illustrated in FIG. 2, and considering that these two configurations even share similar or identical microstructure of the resulting polymeric foam compositions, a major difference between these configurations stems from the locus of crosslinking of the backbone chains; a difference which expresses itself primarily by the macroscopic properties of the resulting polymer, such as shape-memory.

Hence, according to some embodiments of the present invention, it is the locus of crosslinking which is substantially at the solid-gas interface, or near the solid-gas interface in the molecular sense, that gives the backbone chains a sufficient degree of freedom which is then bestowed to the side-chain moieties, and at this configuration the side-chains moieties that are capable of forming a crystalline structure are enabled to form crystalline regions in the bulk of the porous solid matrix.

It is noted herein that in the molecular sense, the locus of crosslinking may be regarded as being immediate vicinity of the solid-gas interface, since the actual locus of crosslinking is not discernable and may lay some short distance away from the exact solid-gas interface into the bulk of the solid. In a molecular sense, a "short distance" means a distance of a few nanometers, or a distance in the range of about 1-200, 1-100, 1-50, or 1-20 nanometers.

As discussed hereinabove, shape-memory characteristics are realized in the polymeric foam composition, according to some embodiments of the present invention, as a result of the accumulation of at least two factors: the locus of the crosslinking hub and the presence of crystallizable side-chain moieties. Crosslinking results in linking one polymer chain to another by covalent bonds, coordinative bonds or ionic bonds. When the term "crosslinking" is used in the synthetic polymer science field, it usually refers to the use of crosslinking agents to promote a difference in the polymer's physical properties.

According to some embodiments of the present invention, the backbone chains of the shape-memory polymeric foam composition presented herein are essentially non-crosslinked in the bulk, namely do not have crosslinks within the bulk of the porous solid matrix, essentially away from the solid-gas interface.

As used herein, the term "bulk" refers to the inner part of a region of a condensed mass, essentially a short distance away from the outer boundaries of the region. In the context of embodiments of the present invention, the bulk region of the shape-memory polymeric foam composition presented herein refers to is any part of, or any location in the solid fraction of the foam which is not in an immediate vicinity of the solid-gas interface (not at the solid-gas interface), namely more than a short distance away from the solid-gas interface, as defined hereinabove.

As crosslinking has a notable effect on the gel contents of a polymer, which is the insoluble fraction of a polymeric composition as measured after extensive extraction in a suitable solvent, the gel content serves as the manifestation of the efficiency of the crosslinking, showing what percent of the backbone chains is connected to the crosslinked network of backbone chains. As demonstrated in the Examples section that follows, the gel contents of exemplary SMP foam compositions presented herein is above 90%, indicating that the crosslinking of the backbone chains substantially at the solid-gas interface has been effective while not rendering the polymer "too stiff" and without losing crystallinity as a result of limiting the mobility of the backbone chains and the side-chain moieties. Such adverse effects on shape-memory characteristics were observed when using the organic soluble comonomer divinylbenzene (DVB) as a crosslinking agent.

Hence, according to some embodiments of the present invention, the gel contents of the SMP foam compositions presented herein is greater than 75%, greater than 85%, or greater than 90%.

The capacity of certain types of side-chain moieties to crystallize stems from the chemical structure of any given type of side-chain moiety. Hence, according to some embodiments of the present invention, the plurality of side-chain moieties comprising the shape-memory polymeric foam composition presented herein are selected such that they possess a capacity to crystallize.

As used herein, the term "moiety" describes portion of a molecule, such as a side-chain branching off a backbone chain in a polymer.

As discussed hereinabove, one of the attributes that defines a shape-memory polymer is the transition temperature. According to some embodiments of the present invention, the transition temperature of the shape-memory polymer as described herein is the melting temperature (Tm) of the shape-memory polymeric foam compositions presented herein. As known in the art, the extent of the change that occurs at Tm (a first order transition) depends upon the degree of crystallinity; the higher the degree of crystallinity, the greater the extent of change in the polymer at the Tm. As a shape-memory transition temperature, a melting temperature is advantageous over other transition points, such as glass transition temperature (a second order transition), since the transition occurs in a narrower temperature range and hence the transformation from the deformed shape to the original shape can be made over a narrower temperature range and at a faster rate.

Furthermore, the Tm of a SMP determines its utility in various applications. For example, the Tm of the SMP determines at which working temperature a device made from the SMP can be deployed, namely triggered to transform from deformed (e.g., compact) to original (e.g., full) shape. An SMP having a high Tm, such as 90° C., will be limited in use for e.g., manufacturing of implantable medical devices, since it would be difficult to trigger the device to deploy at 90° C. in the patient's body. An SMP with a too-low Tm, e.g. below 10° C. would be limited, for example, to applications where the working temperature is lower than room temperature. A useful SMP would be characterized by a Tm that ranges from room temperature and above, and below water boiling point, namely below 100° C.

According to some embodiments of the present invention, the Tm of the shape-memory polymeric foam composition ranges from 20° C. to 60° C.

The pliability of the shape-memory polymeric foam composition presented herein at various temperatures is a direct consequence of its elastic modulus at these temperatures. The elastic modulus should change dramatically below and above the Tm, as would be expected from a polymer that melts and solidifies above and below its Tm.

Hence, according to some embodiments of the present invention, the shape-memory polymeric foam composition presented herein has an elastic modulus that ranges from 0.1 to 10 MPa at a first temperature and an elastic modulus that ranges from 1 to 100 kPa at a second temperature, wherein the first temperature is lower than its Tm and the second temperature is higher than its Tm.

It is noted herein that the methods by which SMPs are tested and characterized involve mechanical tests conducted at various temperatures and other physical conditions, which are typically executed as a series of repetitive tests. Hence, a meaningful value for various attributes of polymers, and particularly in the case of SMPs, is a value that is consistent within a deviation of 10-30 percent above or below the average value. Hence the term "consistent", as used herein, refers to a value that results from a series of tests, which falls within plus or minus 10 to 30 percent of an average value obtained in 2 to 10 repetitive test cycles.

Accordingly, the elastic moduli values presented hereinabove are consistent at both first and second temperature ranges. According to some embodiments of the present invention, the first temperature ranges from 0° C. to 10° C. and the second temperature ranges from 70° C. to 80° C.

As discussed hereinabove, two quantities that are used to describe shape-memory effects are the strain recovery ratio $R_r$ and strain fixity ratio $R_f$. The strain recovery ratio, or "shape recovery ratio", describes the ability of the material to memorize its permanent "original" shape, while the strain fixity ratio, or "shape fixity ratio", describes the ability of switching segments to fix the mechanical deformation, such that the material stays in the deformed shape. The shape-memory polymeric foam composition can also be characterized by the widely used shape-memory attributes, namely shape recovery ratio and shape fixity ratio, which are both relative values given in percent deviation from the original and deformed shape, respectively.

Hence, according to some embodiments of the present invention, the shape-memory polymeric foam composition presented herein is characterized by a shape recovery ratio higher than 80 percent, and a shape fixity ratio higher than 90 percent. It is noted herein that these values are consistent values, as defined hereinabove.

It is noted herein that the thermal history experienced by a polymer can affect both the degree of crystallinity and the melting temperature of the polymer, and the effect on the degree of crystallinity can be pronounced, while the effect on the melting temperature can be relatively mild.

The fraction of the ordered regions in a polymer is referred to herein as the "degree of crystallinity" or "crystallinity", and is given percent values. High values of crystallinity indicate a polymer exhibiting more numerous and/or larger crystalline regions. Most methods of evaluating the degree of crystallinity assume a mixture of crystalline regions, amorphous regions and the transition regions, and include density measurement, differential scanning calorimetry (DSC) and X-ray diffraction (XRD). In density measurements and XRD, the degree of crystallinity is typically determined at a temperature lower than the melting temperature.

Density measurements of crystallinity assume that crystalline regions are more densely packed than amorphous regions, with expected differences of up to 10 to 20 percents depending on the polymeric composition. Calorimetry measurements assume that additional energy is absorbed upon melting the crystalline regions in the polymer, which can be measured with differential scanning calorimetry. X-ray diffraction methods refer to the regular arrangement of atoms and molecules that can produce sharper diffraction peaks compared to amorphous regions that produce broad diffraction rings (halos), and the degree of crystallinity can be estimated by integrating the relative intensities of the peaks and halos.

According to embodiments of the present invention the shape-memory polymeric foam composition presented herein is having a degree of crystallinity (Xc) that ranges from 5 to 95 percent, or from 30 to 60 percent, as demonstrated in the Examples section that follows below.

Solid foams can be classified into open cell structured foams (some of which are reticulated foams) and closed cell foams. Open-cell structured foams contain pores that are connected to each other and form an interconnected network, while closed-cell foams do not have interconnected pores. According to some embodiments of the present invention, the microstructure of the foam is a quasi-closed-cell microstructure, namely a foam having cells that are interconnected by relatively very small openings, which are typically not easily discernable even by scanning electron-microscopy, as shown in the Examples section that follows below. According to some embodiments of the present invention, an average cell diameter in the quasi-closed-cell microstructure characterizing the polymeric foam composition presented herein ranges from 1 μm to 500 μm.

According to some embodiments of the present invention, shape-memory polyHIPEs can be prepared with hydrogel filling the cells of the polyHIPE, and these shape-memory hydrogel-filled polyHIPEs are referred to herein as SM-BCSs. The shape-memory response of SM-BCSs may also occur in liquid media. For example, the shape-memory response can be effected, e.g., by applying stress to a hydrated SM-BCS in water at a temperature above the Tm of the elastomeric component, the temperature is then dropped below the Tm while maintaining the stress on the SM-BCS, thereby fixing the SM-BCS in the deformed shape, and then elevating the temperature of the water above the Tm without applying stress to essentially recover the original shape of the SM-BCS.

Due to the relatively small openings interconnecting the cells (quasi-closed-cell microstructure), the hydrated hydrogel in the BCSs remains trapped inside the cells and becomes part of the composition even when stress is applied thereon.

Without being bound by any particular theory, it is also presumed that some moieties in the hydrogel are mechanically entangled with and/or covalently bonded to corresponding moieties in the polymeric matrix of the polyHIPE.

When dehydrated, the hydrogel may shrink but remains inside the cells. Thus, while the term "foam" describes a porous solid matrix having gas-filled cells, the term "bicontinuous composite structure", or BCS, is used in the context of some embodiments of the present invention to describe substantially similar porous solid matrix having a quasi-closed-cell microstructure as in the case of the foam, other than the voids or cells in the porous solid matrix are filled with a non-gaseous substance other that the substance that makes the porous solid matrix. In such a bicontinuous structure, the two substances constitute two distinctive and continuous yet inter-entangled masses. According to some embodiments of the present invention, the porous solid matrix is made substantially from an elastomer, and the cells are filled with a hydrogel. In such embodiments, the porous solid matrix may contribute to the mass of the composition substantially less compared to the contribution to the mass of the entrapped hydrogel, particularly when fully hydrated.

Herein and throughout, any reference to a SMP foam is applicable to a SM-BCS unless specified otherwise.

As discussed hereinabove, the shape-memory polymeric foam composition as well as the shape-memory bicontinuous composite structures presented herein are products of a polymerization reaction of an external phase of a HIPE, however it is noted that embodiments of the present invention are meant to encompass shape-memory polymeric foam compositions, as defined herein, which were arrived at by other polymerization processes which are not necessarily derived from a HIPE.

According to some embodiments of the present invention, the microstructure of the polymeric foam, as well as that of the BCS, is that of an external phase of a high internal phase emulsion, as this term is used herein and known in the art. Such a foam or BCS is typically obtained by subjecting a high internal phase emulsion (HIPE) having an internal phase and a polymerizable external phase to polymerization of the polymerizable external phase.

From the aspects of the process of preparation and chemical composition, the shape-memory bicontinuous composite structures are distinguished from the shape-memory polymeric foam compositions primarily by having additional ingredients in the internal aqueous phase which can undergo a polymerization/crosslinking reaction to form a hydrogel. For clarity and to distinguish this polymerization process, which takes place in the internal aqueous phase to afford a hydrogel, from the polymerization of the organic phase, this "wet" polymerization is referred to herein as jellification. Accordingly, an internal aqueous phase which includes ingredients which can afford a hydrogel (undergo jellification), is referred to herein as a jellifiable internal aqueous phase.

Hence, according to another aspect of embodiments of the present invention, there is provided a process of preparing a shape-memory polymeric foam composition. The process is effected by subjecting a high internal phase emulsion (HIPE) having an internal aqueous phase and an organic polymerizable external phase to polymerization and crosslinking of the polymerizable external phase. The organic polymerizable external phase includes at least one monomer having a crystallizable side-chain moiety and capable of being polymerized into a plurality of backbone chains, wherein at least a portion of the backbone chains is arranged such that the side-chain moieties are capable of forming a crystalline structure. The polymerization reaction of the process is initiated substantially in the bulk of the polymerizable external phase and the crosslinking reaction is effected substantially at an interface between the polymerizable external phase and the internal phase.

According to an aspect of embodiments of the present invention where bicontinuous composite structures (BCSs) are to be prepared, the process presented herein includes hydrogel-forming polymerization and crosslinking (jellification) of the internal phase of the HIPE, which occurs substantially concomitantly with the polymerization and crosslinking of the external phase. The result of this jellification process is the formation of a hydrogel within the polymerized organic phase that remains therein after the polymerization step. Namely, according to such embodiments, the jellified residue of the internal aqueous phase is not removed but rather remains trapped inside the cells of the quasi-closed-cell microstructure that is obtained during the polymerization and crosslinking reactions of the external phase of the HIPE, thereby forming a bicontinuous composite structure.

According to embodiments of the present invention, when a BCS is prepared with similar constituents and general methods as SMP foams of the present invention, apart from adding hydrogel-forming constituents to the internal aqueous phase of the HIPE, the resulting polyHIPE is a BCS having shape-memory characteristics. Such BCS is also referred to herein as SM-BCS.

Hence, in the context of SM-BCSs, the process is effected by subjecting a high internal phase emulsion (HIPE) having a jellifiable internal aqueous (hydrophilic) phase and an organic (hydrophobic) polymerizable external phase to jellification of the jellifiable internal aqueous phase and polymerization and crosslinking of the polymerizable external phase.

According to this aspect of preparing the SM-BCS presented herein, the jellifiable internal aqueous phase includes at least one hydrophilic monomer, at least one hydrophilic crosslinking agent and a hydrophilic (water-soluble) initiation agent, and the organic polymerizable external phase includes at least one hydrophobic monomer having a crystallizable side-chain moiety and capable of being polymerized into a plurality of backbone chains, wherein at least a portion of the backbone chains is arranged such that the plurality of side-chain moieties is capable of forming a crystalline structure, the polymerization being initiated substantially in a bulk of the polymerizable external phase and the crosslinking of the hydrophobic polymer is effected substantially at an interface between the polymerizable external phase and the internal phase.

As the processes of polymerization and crosslinking are essentially simultaneous, it can be said that among other matters, a HIPE-derived shape-memory polymeric foam composition is afforded when the initiation of polymerization is effected throughout the organic external phase (the bulk of the polymerizable phase) and the crosslinking of the emerging polymeric chains is effected essentially at the location where the internal phase is in contact with the external phase (the interface). As discussed herein, other factors correspond to the shape-memory attributes, such as the presence of crystallizable side-chain moieties.

Hence, according to some embodiments of the present invention at least a portion of the backbone chains are crosslinked substantially in the immediate vicinity of the phase interface of the HIPE, which essentially constitutes the solid-gas interface of the resulting shape-memory polymeric foam composition, and the backbone chains thus arranged such that the crystallizable side-chain moieties are capable of forming a crystalline structure across some regions in the polymer.

In the context of SM-BCSs, the jellification occurs throughout the bulk of the jellifiable internal aqueous phase, and the processes of jellification (internal phase), polymerization and crosslinking (external phase) are essentially simultaneous.

According to some embodiments of the present invention, the ratio of the organic polymerizable external phase to the aqueous internal phase in such a HIPE ranges from 0.05 to 0.67. Alternatively it can be said that the mass ratio of polymerizable external phase to the aqueous internal phase ranges from 5 to 95 (5:95) to 4:6 parts, respectively. Further alternatively it can be said that the mass of the internal phase constitutes from 60% to 95% of the total mass of the HIPE. These phase ratio values correlate with the foam density values presented hereinabove.

The process presented herein further includes a step at which the remaining internal aqueous phase is removed by, for example, draining, drying, centrifugation and any other mean that will facilitate the removal of the internal aqueous phase through the interconnected cells of the quasi-closed-cell microstructure that is obtained during the polymerization and crosslinking reactions. Once the internal aqueous phase is removed, the shape-memory polymeric foam composition presented herein is obtained.

As HIPEs are intrinsically unstable, the HIPE is typically stabilized by adding an emulsion stabilizer to either the internal phase and/or the external phase. The stabilizer typically exhibits an amphiphilic nature, namely it is partly hydrophobic and partly hydrophilic, and by virtue of its contribution to the surface forces at the interface, it stabilizes the emulsion.

HIPE stabilizers include organic (e.g., poly(oxyethylene glycol alkyl ethers)) and inorganic (e.g., polyphosphates) surfactants (small molecules) and, in the case of Pickering HIPE, inorganic or organic particles. Exemplary emulsion stabilizers that are suitable for use in the context of some embodiments of the invention include, without limitation, surfactants such as the Span family of surfactants (such as sorbitan monooleate (SMO), sorbitan monolaurate (SML)), polyglycerol polyricinoleate (PGPR), and the Hypermer family of surfactants, which are all usually used for w/o HIPEs, as well as the Tween family of surfactants, the Triton family of surfactants, sodium lauryl sulfate (SLS), sodium dodecyl sulfate (SDS), usually used for o/w HIPEs, and in addition block copolymers such as PEO-PPO-PEO and the likes, any organic and inorganic particles or nanoparticles, which are surface-modified or unmodified, such as, for a non-limiting example, metal oxide or semi-metal oxide particles, silica particles, titania particles, zirconia particles, alumina particles, carbon black particles and carbon nanotubes.

Another ingredient which is used in the process presented herein is a crosslinking agent. As used herein, the phrase "crosslinking agent" refers to a substance that promotes or regulates intermolecular covalent, ionic, hydrogen or other form of bonding between polymeric backbone chains, linking them together to create a network of backbone chains which result in a more rigid structure. Crosslinking agents, comonomers or nanoparticles having a plurality of polymerizable moieties attached thereon, as defined hereinbelow, contain a functionality greater than two, for example, two double (vinyl) bonds (a functionality of four) or three amines (a functionality of three), creating chemical bonds between two or more polymer backbone chains.

A comonomer crosslinking agent is a monomer that is incorporated into the backbone of a growing polymer in the course of the polymerization reaction. In general, comonomers are used to spread the crosslinks homogeneously along the polymeric backbone chain without any means of controlling the locus of crosslinking. As discussed herein, polyHIPE which were crosslinked with comonomers were not shown to exhibit shape-memory attributes.

The solid-gas interface of the foam, which in the case of Pickering HIPE using nanoparticles to stabilize the emulsion is essentially where the nanoparticles are found after the polymerization reaction, is the locus of crosslinking, and this solid-gas interface corresponds to the interface between the liquid phases in the unpolymerized HIPE. Hence, according to some embodiments of the present invention, the chemical moieties that govern crosslinking should be located at or near the interface. As a mean of effecting the crosslinking reaction substantially at that interface, the crosslinking agent according to some embodiments of the invention, is an amphiphilic surfactant that is also a crosslinking agent.

Examples of amphiphilic surfactant that is also a crosslinking agent may include, without limitations, a block or graft copolymer with a hydrophilic block such as poly(ethylene oxide) and an unsaturated hydrophobic block such as polybutadiene.

Hence, according to some embodiments of the present invention the aqueous internal phase and/or the organic polymerizable external phase include an amphiphilic emulsion stabilizer and crosslinking agent capable of crosslinking the backbone chains at or near the phase interface of the HIPE.

According to some embodiments of the present invention, the HIPE used to produce the shape-memory foam is a Pickering HIPE, namely a HIPE which is afforded and stabilized by use of particles. Pickering emulsions can be made with nanometer-sized or micrometer-sized particles.

The particles can be inorganic (metals, semiconductors, oxides, carbides, nitrides, sulfides, etc.) or organic (polymers insoluble in both phases, crosslinked polymers that can swell but not dissolve). The particles could be of any shape.

According to some embodiments of the present invention, the emulsion stabilizer is in the form of a plurality of silica nanoparticles, and more specifically, a plurality of silica nanoparticles having their surface modified so as to possess the additional functionalities discussed herein and demonstrated in the Examples section that follows.

As used herein, the term "nanoparticle" describes one or more nano-sized discrete mass of solid particles being less than 100 nm in the smallest axis thereof. The nanoparticles, according to some embodiments of the present invention, have an average particle diameter less than about 100 nm, less than about 50 nm, less than about 20 nm, less than about 10 nm, less than about 5 nm and even less than about 1 nm. In some embodiments, the nanoparticles have an average particle diameter in the range of, for example, 1-100 nm, 1-50 nm, 1-20 nm, 1-10 nm or 5-10 nm. According to some embodiments of the present invention, the nanoparticles are inorganic nanoparticles which are suspendable in liquid media and can stabilize a HIPE, namely capable of forming Pickering HIPE compositions. As noted hereinabove, HIPEs can be stabilized with nanometer-sized particles to millimeter-sized particles, hence the description of surface modification of the particles applies to particles of all sizes.

While contemplating the process of preparing the shape-memory polymeric foams presented herein, the conjecture of the present inventors was that conditions suitable for forming a HIPE-derived shape-memory foam can be afforded by, for example, modifying the emulsion-stabilizing nanoparticles to act also as the crosslinking hub, or by modifying a surfactant emulsion stabilizer, which typically resides at the interface, to act as the crosslinking agent (crosslinking hub).

The additional functionalities are added to the nanoparticles by surface modifications, affording modified particles or nanoparticles. The phrases "modified particles", "modified nanoparticles" and any particular examples thereof, such as "modified silica nanoparticles", refer to particles or nanoparticles which have been treated by one or more chemical reactions so as to modify the chemistry of their surface (surface-modified nanoparticles), thereby bestowing chemical reactivity to the nanoparticles which was not present in the parent nanoparticles. In general, when referring to inorganic nanoparticles in the context of an emulsion stabilizer of Pickering HIPE, according to embodiments of the present invention, it is meant to encompass a plurality of fully modified, partially modified and un-modified nanoparticles, unless one is specifically excluded.

As used herein, the phrases "associate with", "associating with" and "attached to" encompass covalent bonding, hydrogen bonding, electrostatic attraction, London forces, π-π interactions, hydrophobic interactions and dipole-dipole interactions.

The surface chemistry of the particles can be modified by any method or process known in the art, such as etching by acid, base, plasma or radiation. In the context of the present embodiments, a nanoparticle is modified by way of grafting, namely covalently attaching a plurality of chemical moieties thereto by reacting one or more surface-modifying agents with reactive surface groups which are found on the surface of the nanoparticle. For instance, a surface modifying and polymerizable agent exhibiting a vinyl group thereon, can be grafted on the nanoparticle by reacting the same with reactive surface hydroxyl groups such that a plurality of polymerizable vinyl moieties are now covalently attached to its surface, thereby modifying the nanoparticle to act as a crosslinking agent (hub).

The type of available reactive surface groups depends on the particular nanoparticle and the process of its manufacturing. Surface groups typically affect the interfacial tension of the nanoparticle in a given media. Typical reactive surface groups include, without limitation, hydroxyl groups, carbonyls, thiols, amines and the likes.

The term "moiety", as used herein, refers to a part of a molecule that possesses a particular structure of functionality. A molecule possessing such functionality can be attached to another chemical entity, thereby conferring, at least to some extent, the same functionality to the chemical entity. Thus, in the context of the present invention, the term "moiety" refers to the active portion of a corresponding agent, while "active" refers to the relevant activity of the agent, which is appended to the term "moiety". In the context of the surface-modified nanoparticles, the surface of the nanoparticle is modified by having "modifying moieties" attached to its surface, hence surface modifying moieties. The surface modifying moieties stem from reacting surface-modifying agents with the nanoparticle via its surface reactive groups. Exemplary modifying moieties include, without limitation, polymerizable moieties and initiation moieties, as defined hereinbelow.

Methods of surface-modifying silica particles using silane functional (meth)acrylates are described, for example, in U.S. Pat. Nos. 4,491,508, 4,455,205, 4,478,876, 4,486,504 and 5,258,225, which are incorporated herein. It is noted herein that agents other that silane can be used successfully in modifying the surface of organic and inorganic particle in the context of the present embodiments.

Useful surface modified silica nanoparticles include silica nanoparticles surface modified with silane surface modifying agents including, e.g., acryloyloxypropyltrimethoxysilane, 3-methacryloyloxypropyltrimethoxysilane, 3-mercaptopropyltrimethoxysilane, n-octyltrimethoxysilane, isooctyltrimethoxysilane, and combinations thereof. Silica nanoparticles can be treated with a number of surface modifying agents including, e.g., alcohol, organosilane including, e.g., alkyltrichlorosilanes, trialkoxyarylsilanes, trialkoxy(alkyl) silanes and combinations thereof and organotitanates and mixtures thereof.

Useful surface modified zirconia nanoparticles include a combination of oleic acid and acrylic acid adsorbed onto the surface of the particle.

Exemplary methods of surface modifying organic particles are disclosed, for example, in U.S. Pat. No. 5,648,407 which is incorporated herein. Other useful surface modification processes and surface modified particles are described in, for example, U.S. Pat. Nos. 2,801,185, 4,522,958, 6,586,483, 7,129,277 and 7,189,768, which are incorporated herein.

In the context of multi-functional modified nanoparticles, according to some embodiments of the present invention, each individual nanoparticle which has been modified to bear a plurality of moieties that can participate in the chain-growth polymerization reaction as would other monomers, is in essence a crosslinking agent that serves as a crosslinking hub. Since any one of the plurality of polymerizable moieties attached to the nanoparticle is capable of becoming a member of a polymeric chain, the nanoparticle itself is the hub for all the polymeric chains that emanate therefrom. Since the modified nanoparticles are essentially amphiphilic emulsion stabilizers, they are located at the phase interface, and serve the dual role of being an amphiphilic emulsion stabilizer and crosslinking agent in a Pickering HIPE.

Collectively, monomers useful for use as polymerizable moieties according to some embodiments of the present invention, may be represented as being a monomer containing a vinyl group (e.g., ethylene, propylene, vinyl chloride, vinyl acetate, acrylates, methacrylates, styrenes, dienes) or a vinylidene group having the structural formula $CH_2=C<$ where at least one of the disconnected valences is attached to an electronegative radical such as phenyl, acetoxy, carboxy, carbonitrile and halogen, examples of the monomers being those hereinbefore listed as well as styrene, vinylnaphthalene, alphamethylstyrene, dichlorostyrenes, alpha-methylene carboxylic acids, their esters, nitriles and amides including acrylic acid, acrylonitrile, acrylamide; the vinyl esters of alkanoic acids including vinyl formate, vinyl acetate, vinyl propionate, vinyl butyrate, vinyl pyridine; the alkyl vinyl ketones including methyl vinyl ketone; the conjugated diolefines including butadiene-1,3; isoprenes chloroprene, piperylene and 2,3-dimethyl-butadiene-1,3.

Additional monomers useful as polymerizable moieties, according to some embodiments of the present invention, include, without limitation, ring-opening monomers such as lactams, lactones, cyclic ethers and epoxides; condensation monomers such as di-carboxylic acids, di-acylhalides, diamines, di-amides, di-esters, diketones, amino-acids, polyols and the likes.

According to some embodiments of the present invention, surface modifying moieties which can be used for transforming nanoparticles into crosslinking agents via a silane or other surface modifying agents, may be monomers having a vinyl ester moiety, including alkyl acrylates and alkyl methacrylates, alkyl maleates such as methyl maleate, alkyl fumarates such as ethyl fumarate, vinyl ethers such as methyl vinyl ether, alkyl methacrylates such as ethyl methacrylate and alkyl itaconates such as ethyl itaconate. When tethered to the surface of the nanoparticle via silane, these surface modifying moieties are referred to collectively as alkoxysilanes.

According to embodiments of the present invention the modified particles or nanoparticles are modified metal oxide or semi-metal oxide nanoparticles and the surface modifying moieties are polymerizable moieties which include an alkoxysilane.

According to embodiments of the present invention the alkoxysilane is selected from the group consisting of 3-(methacryloxy)propyltrimethoxysilane, 3-(acryloxy)propyltrimethoxysilane, vinyltrimethoxysilane and styrylethyltrimethoxysilane.

According to embodiments of the present invention, the modified metal oxide or semi-metal oxide nanoparticles is modified in a solution having a mass ratio of alkoxysilane to nanoparticles that ranges from 0 to 15. As demonstrated in the Examples section below, a series of silica nanoparticles were modified to exhibit various surface density of polymerizable moieties on their surface, by varying this mass ratio.

According to embodiments of the present invention, the concentration of the modified silica nanoparticles ranges from 0.1 percent to 5 percent of the total weight of the HIPE.

Since the polymerizable external phase is the part of the HIPE that undergoes polymerization, the organic external phase can be regarded as an unpolymerized mixture, ready to undergo an initiation event and polymerize. The polymerizable entities in the unpolymerized mixture are typically referred to as monomers. Hence, according to some embodiments of the present invention, the organic external phase is an unpolymerized mixture which includes at least one monomer characterized by having a crystallizable side-chain moiety that is capable of forming crystalline and semi-crystalline structure regions given sufficient degree of freedom, as discussed hereinabove.

In the context of monomers discussed herein, the term "moiety" describes the portion of the monomer that is not made part of the backbone chain after polymerization, hence referred to as a side-chain of a monomer.

As used herein, the phrase "crystallizable side-chain" refers to a moiety that branches-off a polymeric chain sidechain, which is characterized by an inherent capacity to form crystalline regions under certain conditions. The crystallizable side-chain moiety stems from the monomer(s) used to form the polymeric backbone chain, however, an inherent capacity to form crystalline regions is expressed when a plurality of such crystallizable side-chain moieties form a part of a polymer.

A "monomer having a crystallizable side chain" therefore describes a monomer that when polymerized, the obtained polymer can be arranged so as to form a crystalline structure as a result of the presence of these crytallizable side chain in the monomer. Such monomers, which possess a structure that may impart crystallinity to the formed polymer, are recognized in the art.

Exemplary side-chain moieties, which posses the capacity to crystallize (crystallizable side-chain moieties) include, without limitation, long hydrocarbon moieties, aromatic moieties, hydrogen-bond forming moieties, polar moieties and the likes. Long hydrocarbon moieties, driven by van-der-Waals forces, tend to align; aromatic (aryl or heteroaryl) moieties, driven by π-π interaction, tend to stack; and hydrogen-bond forming moieties, driven by hydrogen-bond formation, tend to form donor-acceptor marching pairs. Regardless of the force driving these moieties to crystallize as side-chains in a polymer, such a side-chain moiety is referred to herein as a "crystallizable side-chain moiety".

Non-limiting examples of monomers having a crystallizable side-chain moiety include α-olefins such as 1-octadecene, 1-hexadecene, 1-tetradecene, 1-dodecene, 1-decene, 1-nonene, 1-heptene and the likes; n-alkyl acrylates and n-methacrylates such as octadecyl acrylate/methacrylate, octadecyl acrylate/methacrylate, lauryl (dodecyl) acrylate/methacrylate; non-aliphatic acrylates/methacrylates such as (ethylene glycol) methyl ester acrylate/methacrylate, (ethylene glycol)phenyl ether acrylate/methacrylate; fluorinated n-alkyl acrylates/methacrylates such as tridecafluorooctyl acrylate/methacrylate, heptadecafluorodecyl acrylate/methacrylate, heneicosafluorododecyl acrylate/methacrylate, hexadecafluoro-9-(trifluoromethyl)decyl acrylate/methacrylate; n-acrylamides such as octadecylacrylamide; vinyl ethers and esters such as cetylvinyl ether, vinyl palmitate, vinyl stearate, phenylene ether and vinyls having polyaromatic side-chains such as 4-vinylbiphenyl; n-alkylmaleinimides, phenylmethacrylic esters of n-alkoxybenzoic acids and n-acyl styrenes and siloxanes.

According to some embodiments of the present invention, a long hydrocarbon side-chain moiety in, for example, a vinyl or acrylate monomer or any type monomer, is a branched or unbranched, saturated or unsaturated hydrocarbon chain having a primary chain of 10 to 30 carbon atoms which may be interrupted by one or more hetero-atom, is referred to herein as a "$C_{10-30}$ moiety". A $C_{10-30}$ moiety can be alkyl, alkenyl or alkynyl, as these terms are defined herein.

As used herein, the term "alkyl" describes an aliphatic hydrocarbon including straight chain and branched chain groups. The alkyl group may 10 to 30 carbon atoms, or 10 to 20 carbon atoms. Whenever a numerical range; e.g., "10 to 30", is stated herein, it implies that the group, in this case the alkyl group, may contain 10 carbon atoms, 11 carbon atoms, 12 carbon atoms, etc., up to and including 30 carbon atoms. The alkyl can be substituted or unsubstituted. When substituted, the substituent can be, for example, an alkyl, an alkenyl, an alkynyl, an aryl and/or a heteroaryl, as these terms are defined hereinbelow.

The term "alkenyl" describes an unsaturated alkyl, as defined herein, having at least two carbon atoms and at least one carbon-carbon double bond. The alkenyl may be substituted or unsubstituted by one or more substituents, as described for alkyl hereinabove.

The terms "alkynyl" or "alkyne", as defined herein, is an unsaturated alkyl having at least two carbon atoms and at least one carbon-carbon triple bond. The alkynyl may be substituted or unsubstituted by one or more substituents, as described hereinabove.

The term "aryl" describes an all-carbon aromatic monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents as described for alkyl hereinabove.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Representative examples of heteroaryls include, without limitation, furane, imidazole, indole, isoquinoline, oxazole, purine, pyrazole, pyridine, pyrimidine, pyrrole, quinoline, thiazole, thiophene, triazine, triazole and the like. The heteroaryl group may be substituted or unsubstituted as described for alkyl hereinabove.

As demonstrated in the Example section below, HIPE-derived shape-memory foams were successfully produced by polymerizing exemplary acrylate and methacrylate monomers having the exemplary $C_{18}$ crystallizable side-chain moieties.

In the example of a long hydrocarbon side-chain moiety, one criterion for selecting a suitable monomer is the Tm of the resulting polymer it produces, with preference to long hydrocarbon side-chain moiety monomers having a high degree of crystallinity and a Tm above room temperature. Hence, according to some embodiments of the present invention, the term "$C_{10-30}$ side-chain moiety" includes, without limitation, decanyl ($C_{10}$), undecyl ($C_{11}$), lauryl ($C_{12}$), tridecanyl ($C_{13}$), myristyl ($C_{14}$), pentadecanoyl ($C_{15}$), palmitoleyl ($C_{16}$), palmityl ($C_{16}$), heptadecanyl ($C_{17}$), stearyl ($C_{18}$), linoleyl ($C_{18}$), oleyl ($C_{18}$), nonadecanyl ($C_{19}$), icosanyl ($C_{20}$), docosanyl ($C_{22}$) and any mixtures thereof.

It is noted that these examples should not be taken as limiting in the context of the type of monomer and its polymerization chemistry or the type of crystallizable side-chain moiety and the manner by which it forms crystalline structures.

Exemplary monomers useful in the context of the present embodiments include, without limitation, acrylates, methacrylates, dienes, vinyl esters, vinylidenes, lactams, lactones, cyclic ethers, epoxides, di-carboxylic acids, di-acylhalides, diamines, di-amides, di-esters, diketones, amino-acids, polyols and the likes.

Non-limiting examples of suitable monomers include various acrylates and methacrylates such as stearyl acrylate, stearyl methacrylate, lauryl acrylate and lauryl methacrylate and the likes.

In the context of the present embodiments, the unpolymerized mixture can be composed of more than one type of monomer (comonomers), whereas polymerization of such mixtures leads to the formation of a copolymer. As long as the unpolymerized mixture is capable of forming a HIPE, and the resulting co-polymer is capable of forming crystalline regions to some extent under the conditions described herein, such an unpolymerized mixture containing such monomers is suitable for forming the shape-memory polymeric foam composition presented herein.

According to some embodiments of the present invention, the concentration of the monomer(s) ranges from 5 percent to 40 percent of the total weight of the HIPE.

The type of a monomer defines the type of polymer resulting from its polymerization, and hence defines the backbone chains. Hence, according to embodiments of the present invention, backbone chains in the shape-memory polymeric foam composition resulting from the process presented herein include, without limitation, polyacrylate backbone chains, polymethacrylate backbone chains, polyethylene backbone chains, polyurethane backbone chains, polyamide backbone chains, polyester backbone chains, polysiloxane backbone chains, polyether backbone chains and polyaryl backbone chains.

According to some embodiments, the backbone chains are polyacrylate backbone chains and/or polymethacrylate backbone chains.

According to embodiments of the present invention, the organic external phase, namely the unpolymerized mixture, further includes an organic-soluble initiator agent. It is noted that an organic-soluble initiator agent is more likely to ensure multiple initiation events which would take place throughout the bulk of the polymerizable organic phase.

Exemplary organic-soluble initiator agents include benzoyl peroxide (BPO), azobisisobutyronitrile (AIBN) and dicumyl peroxide (DCP).

It is noted herein that the invention is not limited to the use of one particular polymerization mechanism, and hence not limited to any particular initiation mechanism. However, it is noted that it is preferable that multiple initiation events take place throughout the bulk of the polymerizable organic phase. A variety of polymerization mechanisms including, but not limited to, chain-growth polymerization (free radical, controlled free radical, anionic, cationic and the like) and step-growth polymerization (condensation and addition and the like), ring opening polymerization, and others, are also encompassed and contemplated according to embodiments of the invention presented herein. For example, a photoinitiator can be used, and a light/radiation activated initiator can be dispersed or dissolved in the organic external phase. For another example, a shape-memory foam can be formed from a HIPE which is based on polymer solutions in which evaporation of one or more constituents of the solution (e.g., solvent) is used to produce the final polymeric composition, such that the solidification process is effected by loss or reduction in quantity of one or more volatile component from the HIPE.

The internal aqueous phase of the HIPE may contain additional components and ingredients which can either assist in stabilizing the HIPE, assist in promoting polymerization at the interface and/or contribute to crosslinking at the interface. Other additives may be added to confer various properties to the HIPE or polymerization process, and even to the dried foam, since a solute or at least a portion thereof, may stick to the walls of the porous matrix after the internal phase has been substantially removed. According to some embodiments of the present invention, the aqueous internal phase further includes an aqueous phase stabilization enhancer, such as potassium sulfate, sodium chloride, calcium chloride hydrate and the likes.

The unpolymerized mixture may further comprise reinforcing agents, conducting agents, magnetic agents, curing agents, cure accelerators, catalysts, tackifiers, plasticizers, flame retardants, flow control agents, fillers, organic and inorganic microspheres, organic and inorganic microparticles, organic and inorganic nanoparticles, electrically conductive particles, thermally conductive particles, fibers, antistatic agents, antioxidants, anticorrosion agents, UV absorbers, colorants and other typical additives which add beneficial properties to the finished polymer.

It is noted herein that an additive can also be dispersed rather than dissolved; hence, an additive can be a solid or an immiscible liquid that is engulfed by the organic phase and is uniformly dispersed substantially without forming agglomerates, floating or forming a sediment.

As discussed hereinabove, in embodiments wherein the voids of the elastomeric matrix are filled with a hydrogel, namely where the end product is a BCS, the polymerizable external phase undergoes polymerization and crosslinking, and the hydrogel-forming components in the jellifiable internal aqueous phase undergo jellification. The hydrogel-forming components in the jellifiable internal aqueous phase include water-soluble (hydrophilic) hydrogel-forming monomers, water-soluble (hydrophilic) crosslinking agent(s) and water-soluble (hydrophilic) initiator agent(s), which can form a hydrogel (jellify) upon initiation of polymerization. The hydrogel which is afforded therewith essentially fills the quasi-closed cells of the matrix, thereby forming the continuous hydrogel mass which is intertwined with the continuous elastomeric porous matrix in the BCS.

According to embodiments of the present invention, hydrogel-forming monomers, or hydrophilic monomers, include, without limitation, acrylamide (AAm), acrylic acid (AAc), methacrylaic acid (MAAc), hydroxyethyl acrylate (HEA), hydroxyethyl methacrylate (HEMA), and N-isopropylacrylamide (NiPAAm).

According to embodiments of the present invention, water-soluble or hydrophilic crosslinking agents include, without limitation, N,N'-methylenebisacrylamide (MBAM), N,N'-methylenebis(2-methylacrylamide), methylene diacrylate, methylene bis(2-methylacrylate), diethylene glycol diacrylate, hexamethylene diacrylate, oxybis(methylene)bis(2-methylacrylate), oxybis(ethane-2,1-diyl)bis(2-methylacrylate) and the likes.

According to embodiments of the present invention, water-soluble or hydrophilic initiator agents include, without limitation, a persulfate salt such as potassium persulfate (KPS), rongalite, sulfite, a peroxide and a hydroperoxide.

It is noted herein that the scope of embodiments of the present invention is meant to also encompass processes and products afforded by infiltrating, following SMP foam synthesis and drying the resulting foam, an aqueous solution containing hydrogel-forming monomers, hydrophilic crosslinking agent, and hydrophilic initiation agent, and jellifying the components while inside the soaked SMP-foam. It is also meant to encompass infiltration of water soluble, hydrogel-forming polymers and the chemical means for crosslink these polymers following polyHIPE synthesis and drying.

According to another aspect of embodiments of the present invention there is provided a shape-memory polymeric foam composition prepared essentially by the process presented herein. Such a shape-memory polymeric foam composition and shape-memory hydrogel-filled polymeric bicontinuous composite structures, are characterized by shape fixity and recovery ratios, density, melting temperature and gel contents essentially as described hereinabove.

Such shape-memory polymeric foam compositions and bicontinuous composite structures can be used to form an article-of-manufacture, according to some embodiments of the present invention.

Hence, according to another aspect of embodiments of the present invention there is provided an article-of-manufacture which is wholly or partially made from any of the shape-memory polymeric foam compositions or bicontinuous composite structures presented herein.

According to embodiments of the present invention, an article-of-manufacturing includes at least some structural elements made from shape-memory polymeric foam compositions or bicontinuous composite structures presented herein which include, without limitation, solid bodies, fibers, fabrics, tubes, films, springs, rods, rings, tubular meshes, slotted tubes, coils and the likes.

The shape-memory polymeric foam compositions (SMP foam) or bicontinuous composite structures (SM-BCS) presented herein can be tailor made to suit a particular application, and can thus be selected to be, for example, biocompatible, non-cytotoxic, non-mutagenic, non-immunogenic and the like, acid-resistant, alkaline-resistant, electrically-conducting, -semiconducting or -insulating, light-reflective, UV resistant, and the likes. Such attributes may stem from the polymeric composition in terms of the main monomeric or co-monomeric components, and/or additives added at any stage of the polymerization process to any part of the HIPE, or added following the polymerization in order to achieve, for example, surface modification, surface functionalization, coating and other modifications which are applied to the polyHIPE.

As discussed hereinabove, SMP are particularly interesting as implantable medical devices for minimally invasive surgery. Such devices may include, without limitation, catheters, stents, anchors, bone graft implants, and other implantable devices.

It is noted herein that by virtue of their quasi-closed-cell microstructure, the shape-memory foam compositions or shape-memory bicontinuous composite structures presented herein can be used as effective drug-delivery systems, offering their large surface area as well as the capacity for controlled release from these quasi-closed-cells.

The SMP foam compositions presented herein can be utilized as highly effective liquid adsorption systems, acting in a similar to sponges that can soak-in notable amounts of liquid during shape recovery (expanding).

The SMP foam compositions presented herein can be utilized as highly effective insulation systems that fill and seal vacant spaces while expanding, similar to injectable or sprayable polyurethane foams.

It is expected that during the life of a patent maturing from this application many relevant HIPE-derived shape-memory foam compositions or shape-memory bicontinuous composite structures will be developed and the scope of the term HIPE-derived shape-memory foam composition or shape-memory bicontinuous composite structures is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ ranges from" a first indicate number "to" a second indicate number are used herein interchangeably and are meant to include the first and second indicated numbers and all the fractional and integral numerals therebetween.

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Example 1

Materials and Methods

Materials for Exemplary Shape-Memory PolyHIPEs:

The monomers used for polyHIPE synthesis were stearyl acrylate (A18, $H_2C=CHCO_2C_{18}H_{37}$, acrylate with a $C_{18}$ side-chain moiety, Sigma-Aldrich), stearyl methacrylate (M18, $H_2C=C(CH_3)CO_2C_{18}H_{37}$, and methacrylate with a $C_{18}$ side-chain moiety, Sigma-Aldrich).

Several types of silane-modified nanoparticles (SM-NPs) crosslinking agents were prepared as follows. An ethanol/water solution (95 percent by volume ethanol) and an aqueous acetic acid solution (5.5 percent by volume acetic acid, 1 M) were prepared. The pH of the ethanol solution was adjusted to 4.5 by adding 3 percent by volume of the acetic acid solution thereto. An alkoxysilane was then added to the ethanol/acetic acid solution with the mass ratio of silane-to-NPs (hereinafter $r_m$) varied from 0 to 10.6 and left for 1 hour, during which it would undergo hydrolysis and condensation.

Fumed silica nanoparticles (NPs) having an average diameter of 7 nm and a surface area of 390 $m^2/g$ (Sigma) were added thereafter to the ethanol/acetic acid solution and the mixture was stirred for 0.5-1 hour. The particles were filtered using Whatman No. 1 filter paper through a Buchner funnel and dried overnight at 70° C. in a convection oven.

The alkoxysilane coupling agent had a silane functionality of three (trimethoxysilane) and bore a reactive vinyl group. An exemplary alkoxysilane used was: 3-(methacryloxy)propyltrimethoxysilane (MPtMS, 248.3 g/mol, by Alfa Aesar).

For silane-modified nanoparticles of type M2-NP, MPtMS at 4.2 percent by weight of the solvents was added and left for 1 hour. Silica nanoparticles, 0.7 percent by weight of the solvents, were then added thereafter and the $r_m$ was marked at 6.

For reactions using conventional radical polymerization, benzoyl peroxide (BPO, Fluka Chemie) was used as an organic-soluble initiator. Potassium sulfate ($K_2SO_4$, Frutarom, Israel) was added to the aqueous phase as a stabilization enhancer.

For some polyHIPEs, methyl methacrylate (MMA, Aldrich) containing 1 percent by weight BPO was infiltrated into the polyHIPE and polymerized before sample ultramicrotomy for microscopic analysis.

Solvent Polymerizations:

Solvent polymerization was used to synthesize non-porous control materials for analysis of shape-memory polyHIPEs. Two control polymers were synthesized: A18 homopolymer (denoted A18 HP) and M18 homopolymer (denoted M18 HP). The side chain monomer and solvent benzene in ratio of 1:1 were mixed in a beaker with a magnetic stirrer. The BPO initiator in amount of 1 percent by weight, relative to the monomer mass, was added to the monomer solution. Polymerization took place at 65° C., stirring under reflux for 24 hours. The resulting polymer solution was precipitated in methanol and dried in a convectional oven at 80° C. until a constant weight was achieved.

Formulation and Synthesis of Exemplary Shape-Memory PolyHIPEs:

The organic phase consisted of monomers, initiator and silane-modified NPs. The aqueous phase, about 84 percent by weight of the HIPE, consisted of water and an aqueous phase stabilization enhancer. The nanoparticle content varied from 1.8 (rounded to 2) to 10 percent by weight of the monomer mass.

Exemplary shape-memory polyHIPEs contained A18 or M18 as a monomer, while the NP content varied from 1.8 (rounded to 2) to 10 percent by weight of the monomer mass. PolyHIPEs were denoted as A18-x or M18-x, where x is the NP content.

The HIPEs were prepared at 50° C., above the melting point of the monomers. The aqueous phase was slowly added to the organic phase with continuous stirring. The HIPE was covered with aluminum foil and polymerized in a circulating air oven at 65° C. for 24 hours. After polymerization the polyHIPEs were dried in a freeze-drier (Christ, Alpha 1-2 LD plus) for 48-72 hours, until a constant weight was achieved.

Formulations of exemplary shape memory polyHIPEs were polymerized using organic-soluble initiator only, and are listed in Table 1 below.

TABLE 1

| HIPE phase | Ingredient | HIPE formulation denotation | | | |
|---|---|---|---|---|---|
| | | A18-5 | M18-2 | M18-5 | M18-10 |
| External/organic (wt %) | A18 | 14.08 | | | |
| | M18 | | 14.15 | 14.08 | 13.98 |
| | M2-NPs | 0.75 | 0.25 | 0.75 | 1.40 |
| | BPO | 0.20 | 0.20 | 0.20 | 0.20 |
| | Total | 15.02 | 14.60 | 15.02 | 15.58 |
| Internal/aqueous (wt %) | Water | 84.56 | 84.98 | 84.56 | 84.00 |
| | $K_2SO_4$ | 0.42 | 0.42 | 0.42 | 0.42 |
| | Total | 84.98 | 85.40 | 84.98 | 84.42 |

PolyHIPE Properties:

The polyHIPE density, ρ, was determined using gravimetric analysis. The polymerization yield was based on the poly-HIPE mass following drying. The gel content (GC) was the mass fraction that remained when the dried polyHIPEs were immersed for 48 hours in boiling xylene and then dried in a vacuum oven.

Microscopy:

The microstructure of the resulting polyHIPEs was characterized using low vacuum scanning electron microscopy (SEM) of uncoated cryogenic fracture surfaces (FEI Quanta 200, 20 kV). The average polyHIPE void diameters, Dv, were calculated from the SEM micrographs using a correction for the statistical nature of the cross-section. The polyHIPEs were infiltrated with MMA containing 1 percent by weight BPO during 1 hour under vacuum. The MMA was polymerized at 50° C. in a circulating air oven. Specimens 70 to 80 nm thick were prepared from the PMMA-filled polyHIPEs using ultramicrotomy (Ultracut E, Reichert-Jung) and viewed using TEM (FEI Technai G2 T20 S-Twin, operating at 200 kV).

Mechanical and Thermal Properties:

Compressive stress-strain measurements were carried out until displacement limitations were reached (Instron 3345). The moduli were calculated from the initial slopes of the stress strain curves.

The thermal properties of the polyHIPEs were characterized using dynamic mechanical thermal analysis (DMTA) temperature sweeps at 3° C. per minute in compression at a frequency of 1 Hz on 5×5×5 mm³ cubes (DMTA IV, Rheometric Scientific).

Differential scanning calorimetry (DSC) temperature scans were used to determine amounts of crystallinity in the polymers.

The thermal properties of shape memory polyHIPEs (melting temperature, Tm, and the heat of the melting endotherm, ΔH) were investigated using differential scanning calorimetry (DSC, Mettler DSC-821 calorimeter). The samples were heated from −100° C. to 150° C. at a rate of 10° C. per minute in nitrogen. Estimates for the degree of crystallinity (Xc) were calculated by using Equation 1:

$$X_c = \frac{\Delta H_{exp}}{n \cdot \Delta H_{f-CH_2} \cdot w_t} \quad \text{Equation 1}$$

where $\Delta H_{exp}$ is the heat of melting of the sample, n is the number of carbon atoms in the alkyl side chain, $\Delta H_{f-CH_2}$ is the contribution of each methylene group (3.4 kJ/mol), and $w_t$ is the weight percent of the side chains in the polyHIPE.

Crystalline Structure:

The crystalline structure was investigated by using X-ray diffraction (XRD, Philips PW 1840 X-ray) with a Ni-filtered Cu-Kα X-ray beam excited at 40 kV and 40 mA.

Shape-Memory Properties:

The exemplary shape-memory polyHIPEs were tested for four cyclic thermomechanical tests (N=4) of deformation and recovery, according to a strain-controlled programming module.

The samples were cut to 10×10×10 mm³ cubes, the cubes were deformed in one dimension, and the initial cube dimension, $z_i(N)$, was measured.

In each deformation and recovery cycle, the samples were heated at 70° C. on an Instron machine (Instron 3345), decorated with custom designed oven and temperature controller. Formulation denoted A18-5 was heated for 1 hour, while formulations M18-2, M18-5 and M18-10 were heated for 20 minutes. The samples underwent a compressive stress-strain deformation test, conducted at 70° C. no the imposed deformation dimension $z_d$. The samples were cooled at a constant deformation under stress to room temperature (RT) for 1 hour. Thereafter, the stress was removed and the final deformed cube dimension, $z_u$, was measured.

The shape fixity ratio, $R_f(N)$ in $N^{th}$ deformation and recovery cycle, was calculated, according to Equation 2:

$$R_f(N) = \frac{z_i(N) - z_u(N)}{z_i(N) - z_d(N)} \cdot 100\%. \quad \text{Equation 2}$$

The compressed samples underwent recovery using creep mode above 0.1 μm under minimal stress of 50 kPa (DMTA IV, Rheometric Scientific) during a temperature sweep at 1° C. per minute, while the deformed cube dimension underwent recovery.

After the recovery cycle, the samples were placed in a convection oven operating at 70° C. for 10 minutes for a final recovery step with no minimal stress applied. The recovered cube dimension, $z_f$, was measured after cooling to room temperature. $z_f(N)$ was used as the initial deformation in the next cycle, $z_i(N+1)$).

The shape recovery ratio, $R_r$, was calculated according to Equation 3:

$$R_r(N) = \frac{z_f(N) - z_d(N)}{z_i(N) - z_d(N)} \cdot 100\%. \quad \text{Equation 3}$$

Figure 4A:
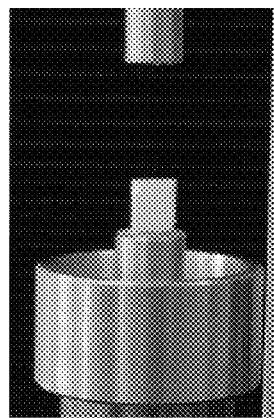
FIGS. 4A-C present three photographs of a sample of an exemplary shape-memory polyHIPE, according to some embodiments of the present invention, wherein the sample is shown in its original shape (FIG. 4A), in its deformed shape (FIG. 4B) and after recovery (FIG. 4C), thereby constituting a deformation and recovery cycle.
Figure 4B:
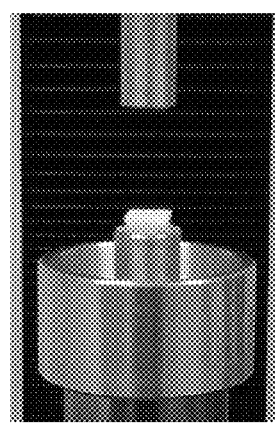
Figure 4C:
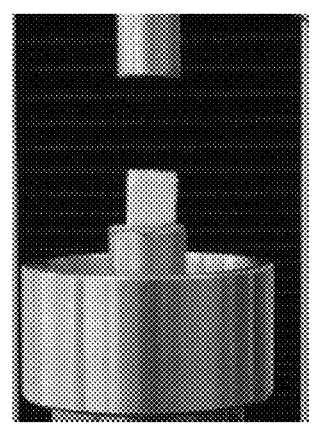

FIGS. 4A-C present three photographs of a sample of an exemplary shape-memory polyHIPE, according to some embodiments of the present invention, wherein the sample is shown in its original shape (FIG. 4A), in its deformed shape (FIG. 4B) and after recovery (FIG. 4C), constituting a deformation and recovery cycle.

Example 2

Structure and Properties of Shape-Memory PolyHIPEs

Exemplary Pickering HIPEs based on exemplary long side-chain monomers A18 and M18, were successfully produced as described hereinabove, using exemplary M2-NPs ($r_m$ is 6) for Pickering HIPE stabilization, exhibiting a high amount of bound silane (higher density of vinyl groups). The polymerization of Pickering HIPEs using a water-soluble initiator (interfacial polymerization) resulted in polyHIPEs with low polymerization yields, possibly due to the lower mobility of the long side-chain monomer that prevents them from diffusing to the oil-water interface. Hence, the Pickering HIPEs were based on A18 and M18 that were polymerized using an organic-soluble initiator.

As presented hereinabove, the amount of M2-NPs in the various formulations was varied in the M18-based polyHIPEs from 2 percent by weight to 10 percent by weight, relative to the monomer (see, Table 1 hereinabove).

Figure 5A:
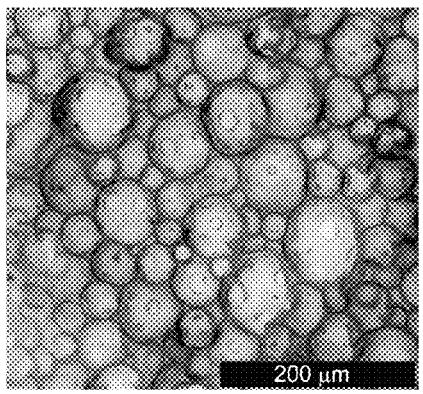
FIGS. 5A-H present SEM micrographs showing the microstructure of exemplary shape-memory polyHIPEs, according to some embodiments of the present invention, wherein shape-memory polyHIPEs resulting from HIPE formulation A18-5 is presented in FIGS. 5A-B; formulation M18-2 in FIGS. 5C-D, formulation M18-5 in FIGS. 5E-F and formulation M18-10 in FIGS. 5G-H.
Figure 5B:
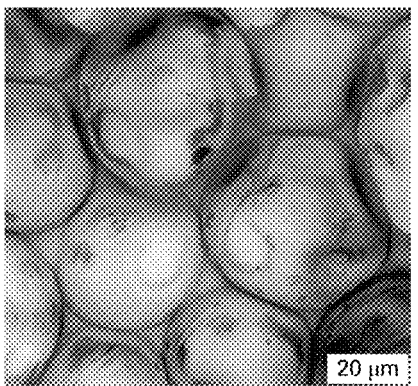
Figure 5C:
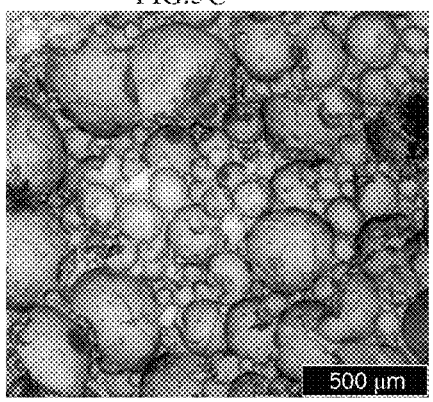
Figure 5D:
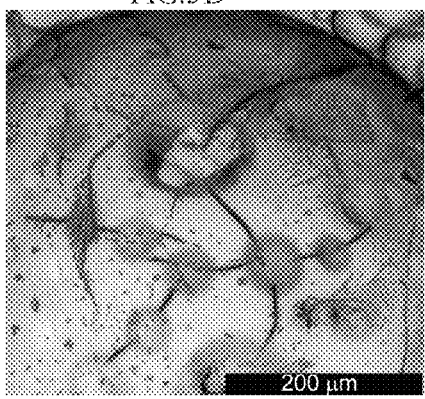
Figure 5E:
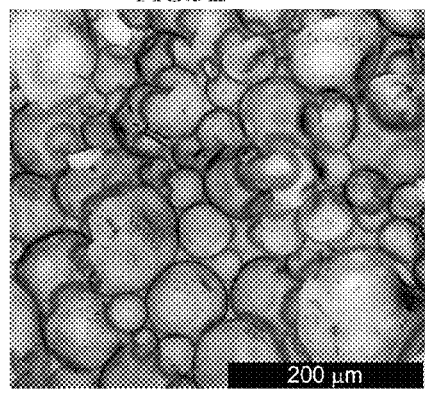
Figure 5F:
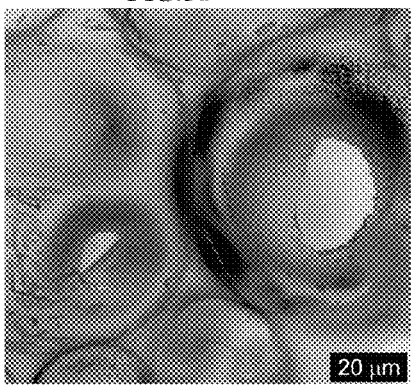
Figure 5G:
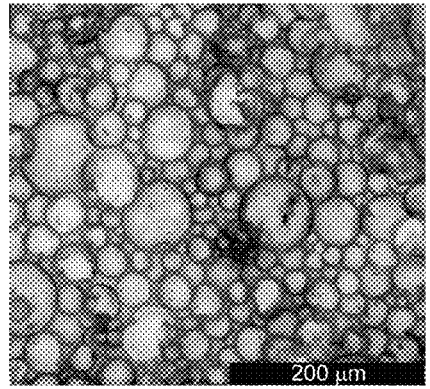
Figure 5H:
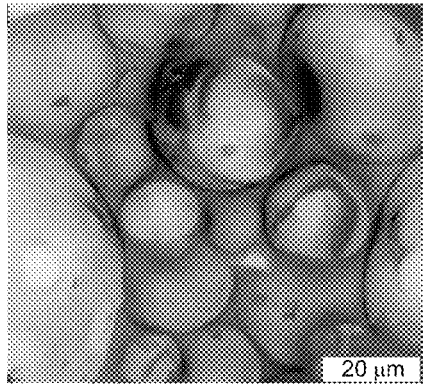

FIGS. 5A-H present SEM micrographs showing the microstructure of exemplary shape-memory polyHIPEs (SM-polyHIPEs), according to some embodiments of the present invention, wherein SM-polyHIPE resulting from HIPE formulation A18-5 is presented in FIGS. 5A-B; formulation M18-2 in FIGS. 5C-D, formulation M18-5 in FIGS. 5E-F and formulation M18-10 in FIGS. 5G-H.

Table 2 below summarizes some properties of homopolymers and exemplary shape-memory polyHIPE formulations (the tilde "~" symbol represents the term "about").

TABLE 2

| Formulation | Yield, % | $\rho$, g/cm$^3$ | $D_v$, μm | GC, % | $T_m$, °C. | $X_c$, % |
|---|---|---|---|---|---|---|
| A18 HP | 93.0 | 0.78 | NA | 0.0 | 47.6 | 65 |
| M18 HP | 84.6 | 0.82 | NA | 0.0 | 29.3 | 51 |
| A18-5 | 81.6 | 0.15 | ~22, ~80 | 91.1 | 47.5 51.2 | 59 |
| M18-2 | 70.0 | 0.11 | ~100, ~275, ~550 | 75.6 | 31.7 | 43 |
| M18-5 | 88.4 | 0.14 | ~65, ~165 | 98.5 | 29.4 | 48 |
| M18-10 | 82.3 | 0.19 | ~35, ~100 | 96.6 | 30.3 | 48 |

As can be seen in FIGS. 5A-H and Table 2, a bimodal void-size distribution is obtained where the average void dimensions varied from 22 to 165 μm. However, polyHIPE obtained with formulation M18-2 exhibited a trimodal void-size distribution with larger average void sizes. The relatively amount of M2-NPs in M18-2 reduced Pickering HIPE stability, as reflected in the lower polymerization yield and the lower density (see, Table 2). M18-10 exhibited higher density than internal phase content indicating that it underwent partial collapse during synthesis.

The microstructure of the voids is typical for polyHIPE from Pickering HIPE that underwent organic-phase initiation. All the polyHIPEs exhibit flaws and cracks in the void walls.

As can be seen in Table 2, A18- and M18-based polyHIPEs were easily dried, and the gel contents (GC) for A18-5, M18-5 and M18-10 formulations were above 90 percent, indicating the crosslinking ability of M2-NPs in combination with organic-phase initiation. As expected, the gel content of M18-2 is lower, reflecting the lower content of crosslinking NPs.

As can be seen in Table 2, the crystallinity of NP-crosslinked polyHIPEs is only slightly lower than those of bulk homopolymers. The side-chains from acrylate-based polymers have an enhanced ability to pack into crystalline regions compared to the side-chains from methacrylate-based polymers because of the greater flexibility of the acrylate backbone. This is reflected in the higher crystallinity of A18-5, compared to that of the M18-based polyHIPEs.

FIGS. 6A-D present TEM micrographs taken for the exemplary shape-memory polyHIPE samples, prepared from the A18-5 formulation (FIGS. 6A-B) and the M18-10 formulation (FIGS. 6C-D), showing cross sections of typical void walls.

Figure 6A:
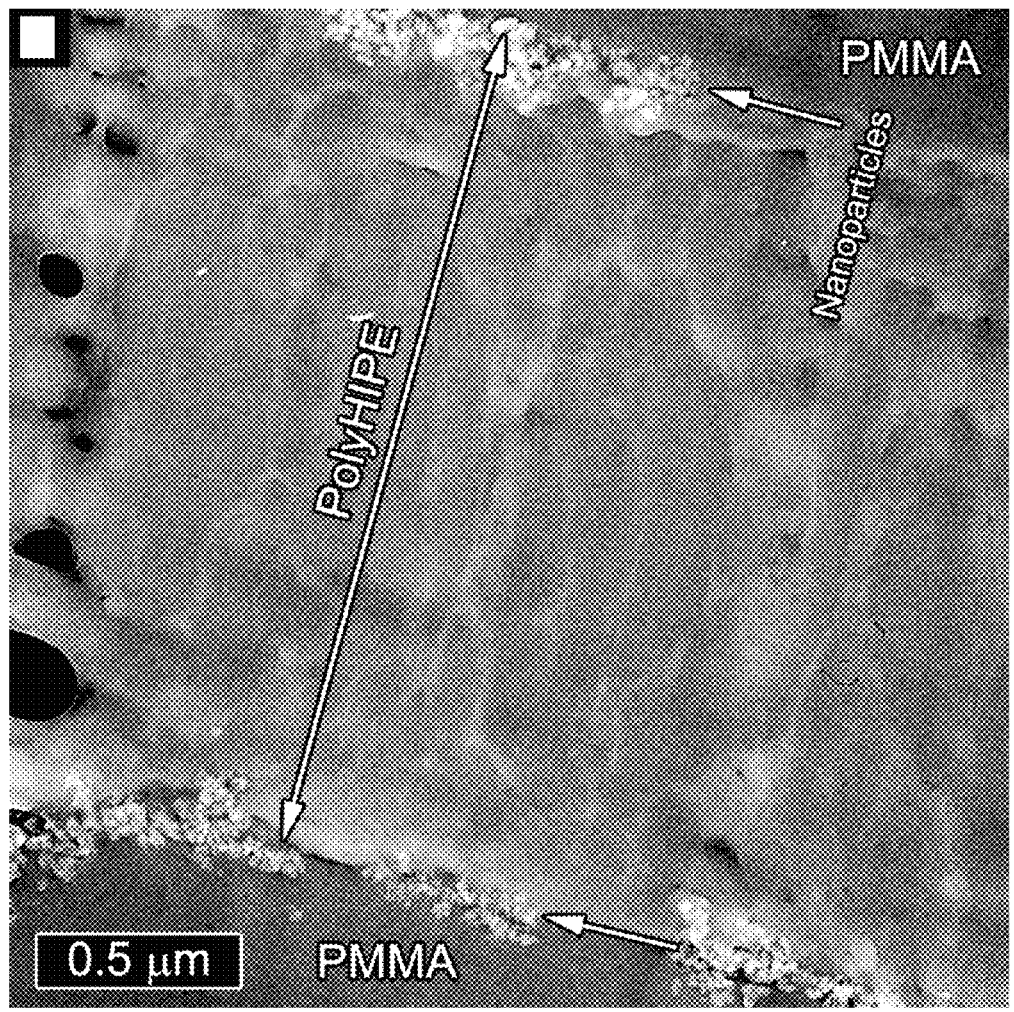
FIGS. 6A-D present TEM micrographs taken for the exemplary shape-memory polyHIPE samples, prepared from A18-5 formulation (FIGS. 6A-B) and M18-10 formulation (FIGS. 6C-D), showing cross sections of typical void walls.
Figure 6B:
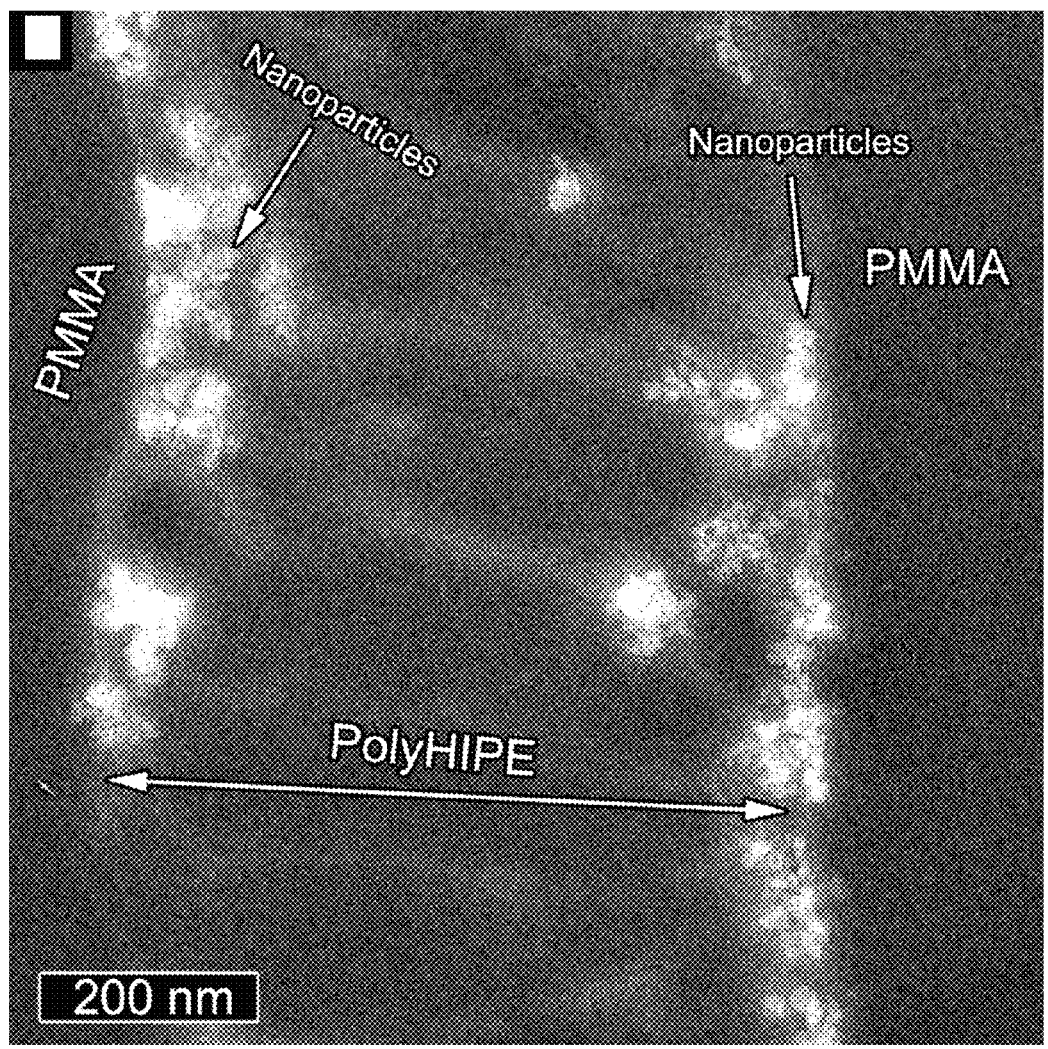
Figure 6C:
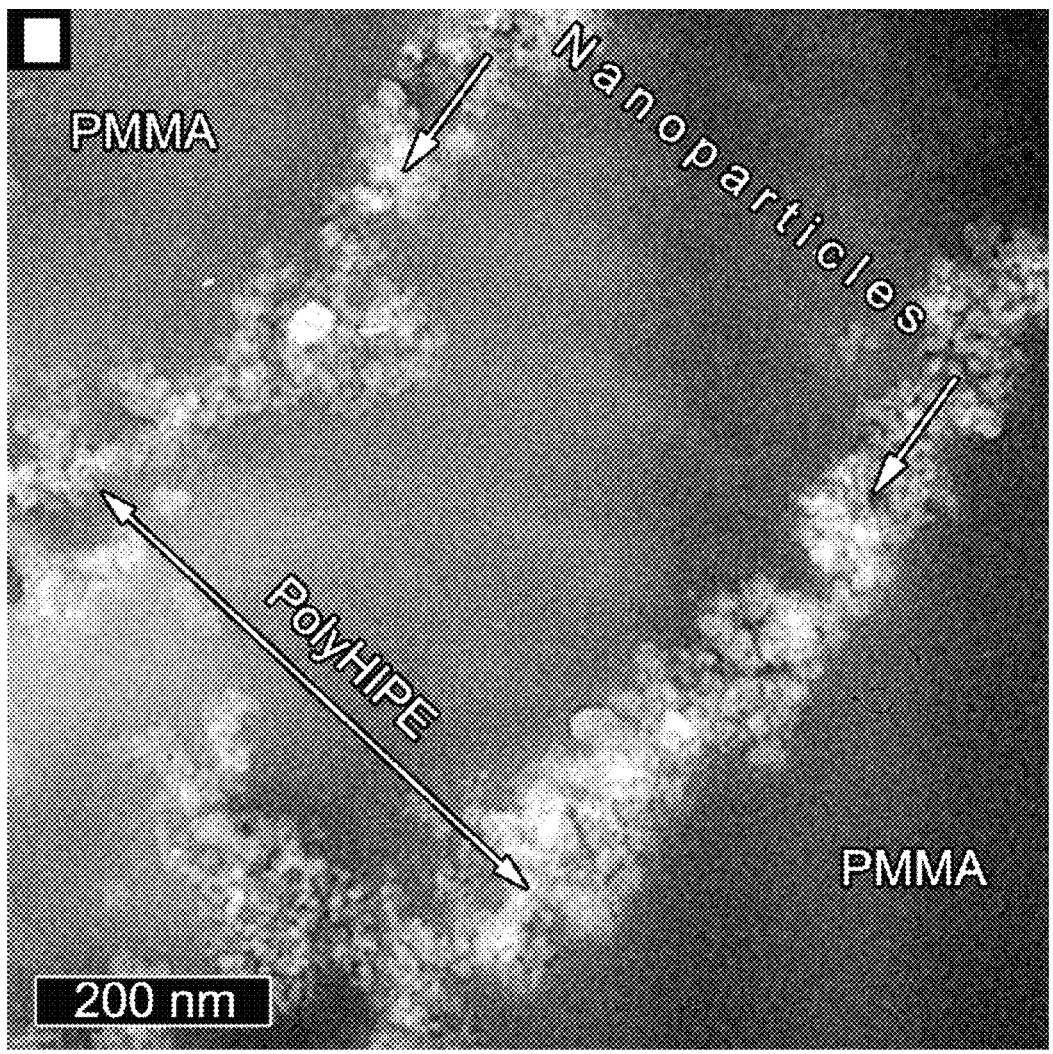
Figure 6D:
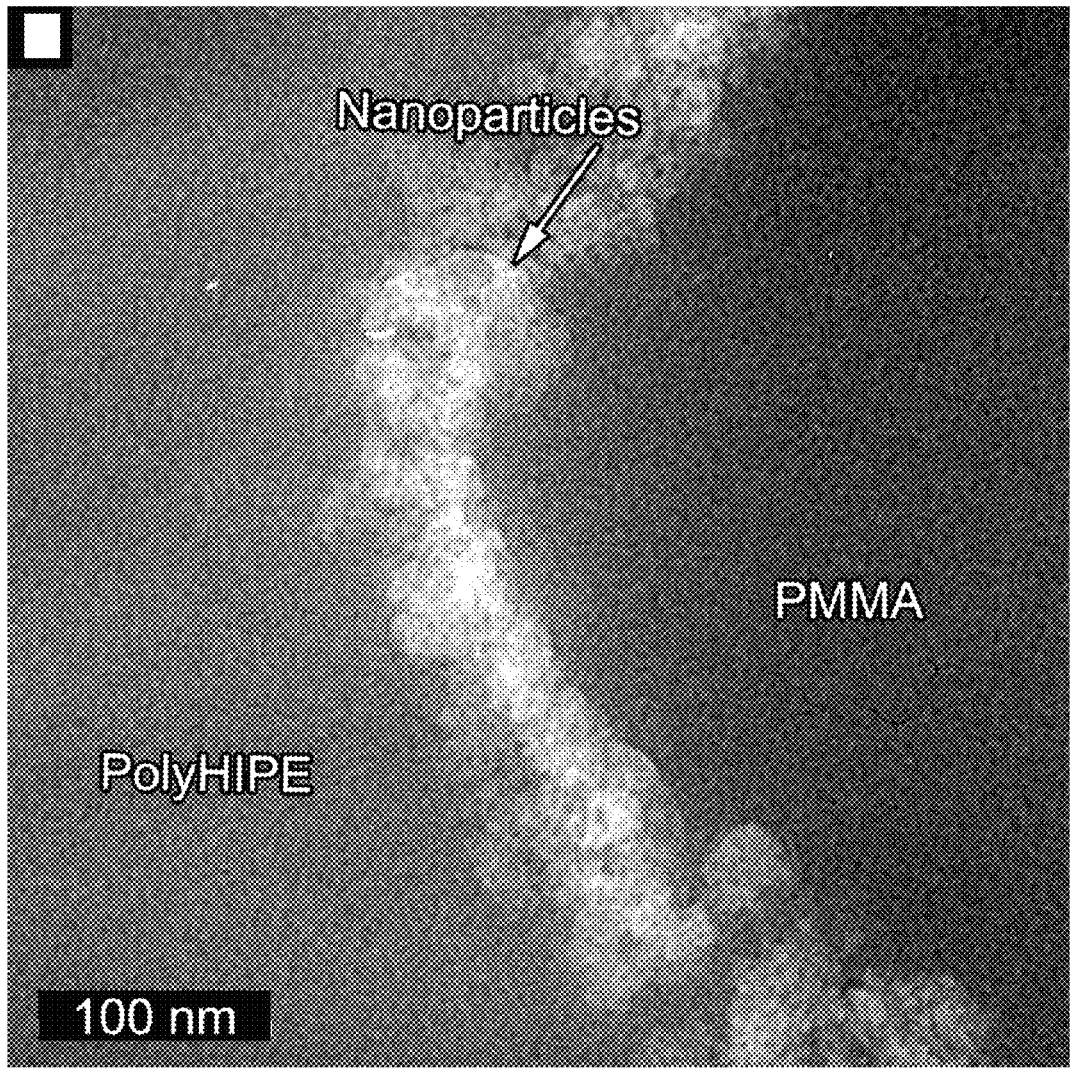

As can be seen in FIGS. 6A-D, the M2-NPs are located near the void surface, between the polyHIPE and PMMA. Since the void surface was the oil-water interface in the HIPE, there was no significant change in NP location during polymerization. The greater amount of M2-NPs in M18-10 is reflected in the denser layer of the nanoparticles near the void surface (FIGS. 6C-D).

Degree of Crystallinity:

Without being bound by any particular theory, it is noted that polymers made from long side-chain monomers should exhibit a crystallizable phase in order to exhibit shape memory behavior. Differential scanning calorimetry (DSC) thermograms for all the polyHIPEs have exhibited melting peaks at temperatures close to the melting temperature of the bulk homopolymers (see, Table 2 and FIGS. 7A-B).

Figure 7A:
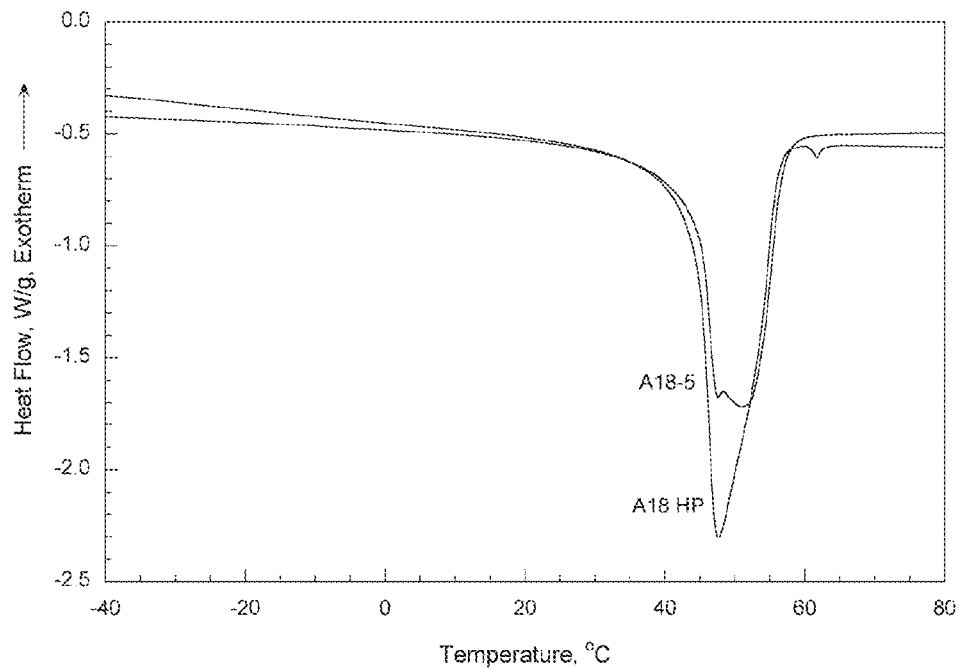
FIGS. 7A-B are two DSC thermograms plotting heat-flow as a function of temperature, as measured for control bulk polymer A18 HP and the exemplary shape-memory polyHIPE A18-5 (FIG. 7A), and for control bulk polymer M18 HP and the exemplary shape-memory polyHIPEs M18-2, M18-5 and M18-10 (FIG. 7B)
Figure 7B:
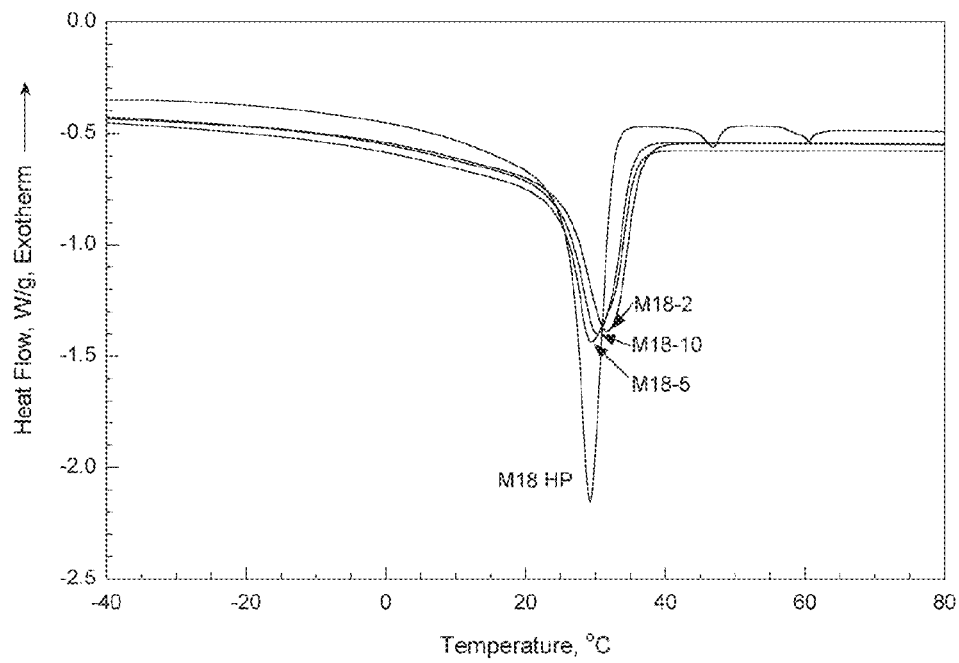

FIGS. 7A-B are two DSC thermograms showing heat-flow as a function of temperature, as measured for control bulk polymer A18 HP and the exemplary shape-memory polyHIPE A18-5 (FIG. 7A), and for control bulk polymer M18 HP and the exemplary shape-memory polyHIPEs M18-2, M18-5 and M18-10 (FIG. 7B).

As can be seen in FIGS. 7A-B, the Tm of A18-5 is above room temperature, while the Tm of the M18-based polyHIPEs are about room temperature (also see, Table 2), opening the path to interesting applications. A18-5 exhibits two melting temperatures, possibly due to two different crystallizable phases (FIG. 7A). The Tm peaks of the M18-based polyHIPE were not affected by the various NP contents (FIG. 7B).

Sharp reflections at 2θ angles of about 21° were reported for the A18 and M18 bulk polymers. These angles corresponded to a (1,0,0) lattice constant of 4.15 Å for the A18 bulk polymer and 4.17 Å for the M18 bulk polymer.

Figure 8A:
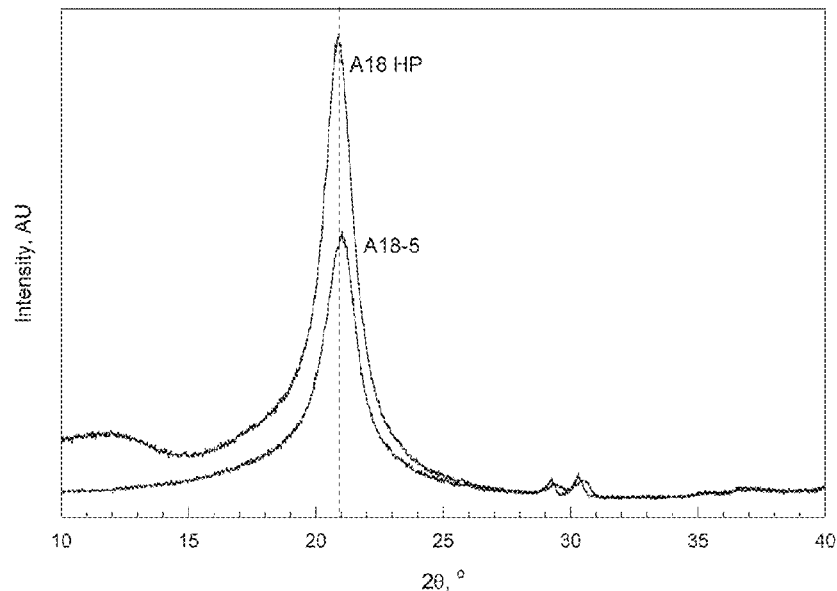
FIGS. 8A-B present plots of X-ray scattering intensity as a function of twice the diffraction angle, measured from polymer samples of A18 HP and A18-5 (FIG. 8A), and polymer samples of M18 HP, M18-2, M18-5 and M18-10 (FIG. 8B)
Figure 8B:
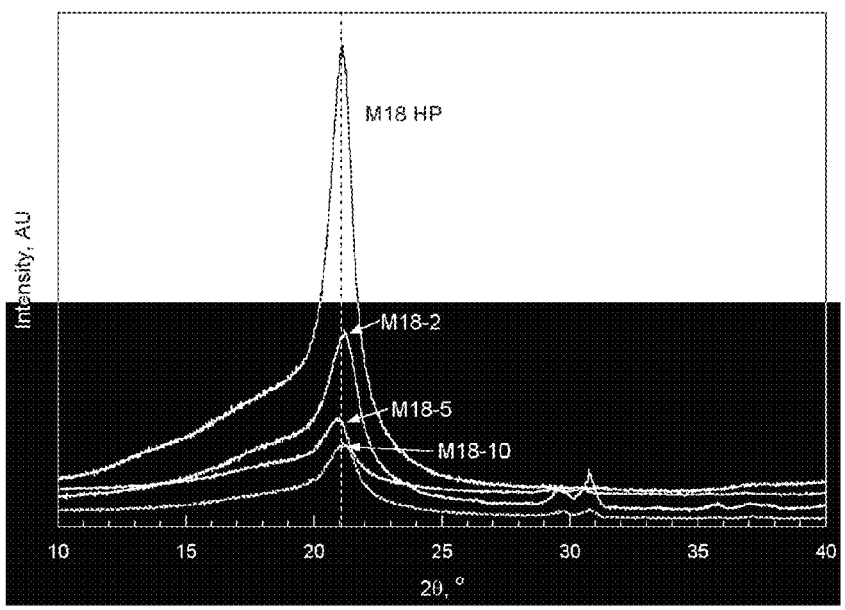

FIGS. 8A-B present plots of X-ray scattering intensity as a function of 2θ angle, measured from polymer samples of A18 HP and A18-5 (FIG. 8A), and polymer samples of M18 HP, M18-2, M18-5 and M18-10 (FIG. 8B).

As can be seen in FIGS. 8A-B, all bulk polymers and polyHIPEs exhibit X-ray scattering peaks at 2θ angles of about 21°. The highest intensity peaks were from A18 HP and M18 HP. The calculated Bragg d-spacings were slightly higher than in the literature: 4.25 Å for A18 HP, 4.22 Å for A18-5, 4.20 Å for M18 HP, and 4.19 to 4.24 Å for the M18-based polyHIPEs. The intensities of the spectra from the polyHIPE were of lower intensity due to the relatively low densities of the polyHIPE samples.

Hence, the high crystallinity of the exemplary polyHIPEs, according to some embodiments of the present invention, infer good shape-memory attributes as observed in the DSC and X-ray scattering experiments.

Example 3

Shape-Memory Attributes of PolyHIPEs

Figure 9:
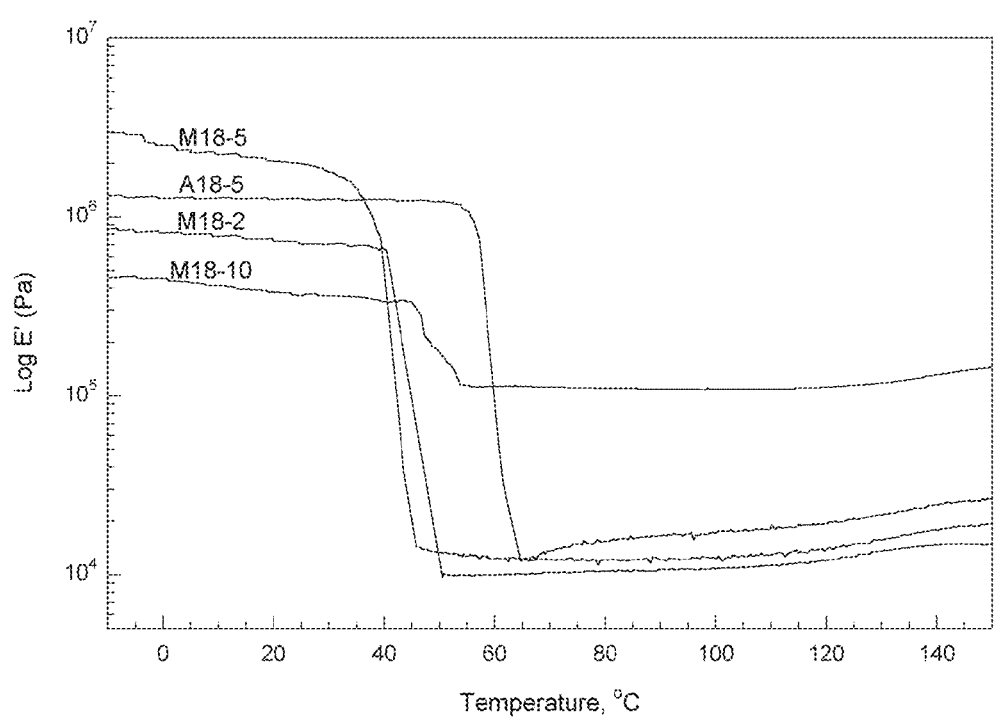
FIG. 9 presents comparative plots of storage moduli (E') as a function of temperature as measured for exemplary shape-memory polyHIPEs prepared from formulations denoted A18-5, M18-2, M18-5 and M18-10, according to some embodiments of the present invention.

Deformation and Recovery:

FIG. 9 presents comparative plots of storage moduli (E') in compression as a function of temperature as measured for exemplary shape-memory polyHIPEs prepared from the formulations denoted A18-5, M18-2, M18-5 and M18-10, according to some embodiments of the present invention.

As can be seen in FIG. 9, the polyHIPE storage moduli (E') depend strongly on temperature. The values of E' decrease by two orders of magnitude for A18-5, M18-2 and M18-5 around the polyHIPEs' melting temperatures, while the change in E' for M18-10 was only one order of magnitude. This significant decrease in the storage moduli is attributed to melting of the side-chain crystalline regions, converting the stiff polyHIPEs to elastomeric polyHIPEs.

Figure 10A:
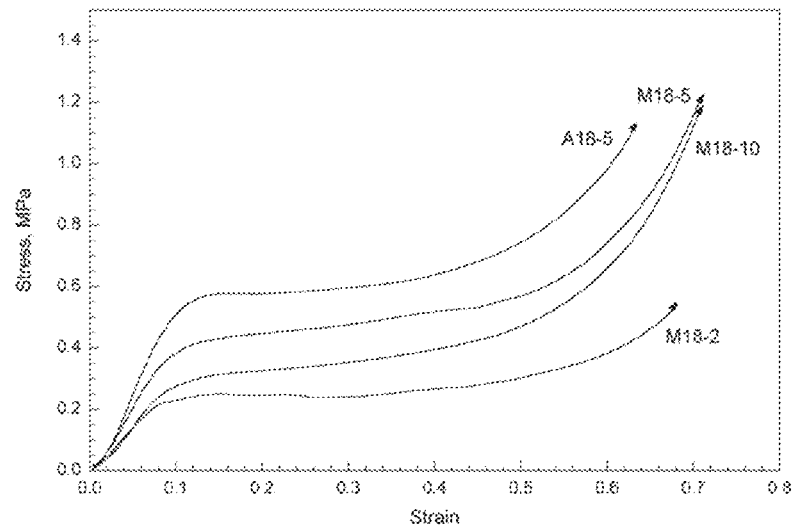
FIGS. 10A-C present comparative stress-strain curves of exemplary shape-memory polyHIPEs prepared from formulations denoted A18-5, M18-2, M18-5 and M18-10, according to some embodiments of the present invention, obtained at room temperature (FIG. 10A) and obtained at 70° C. using a separate y-axis for A18-5 on the right hand side (FIG. 10B) and using the same y-axis for all samples (insert FIG. 10C)
Figure 10B:
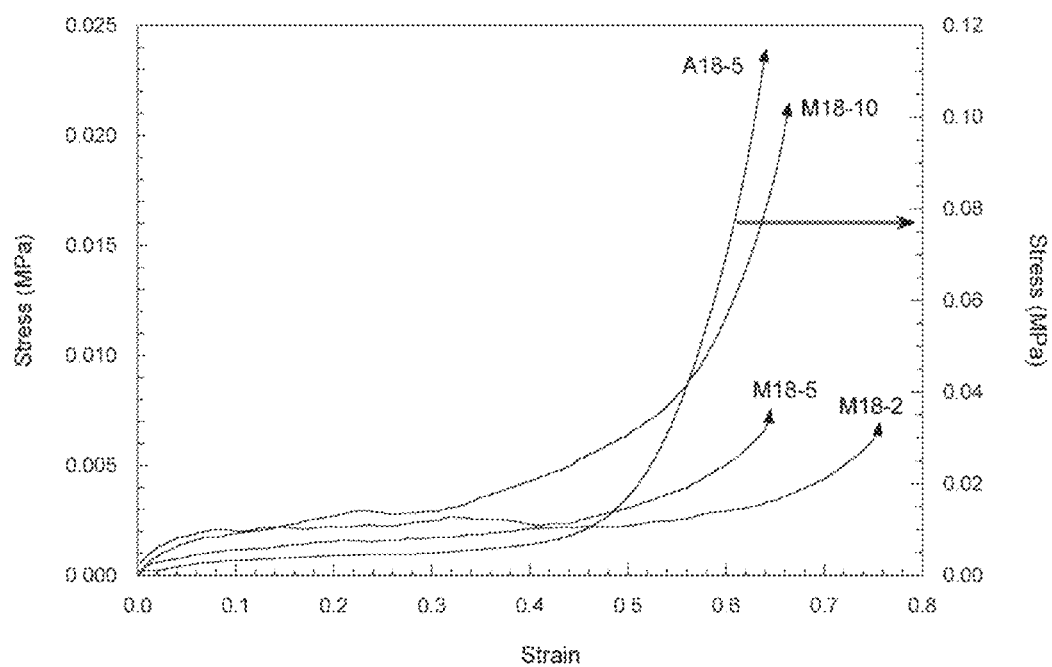
Figure 10C:
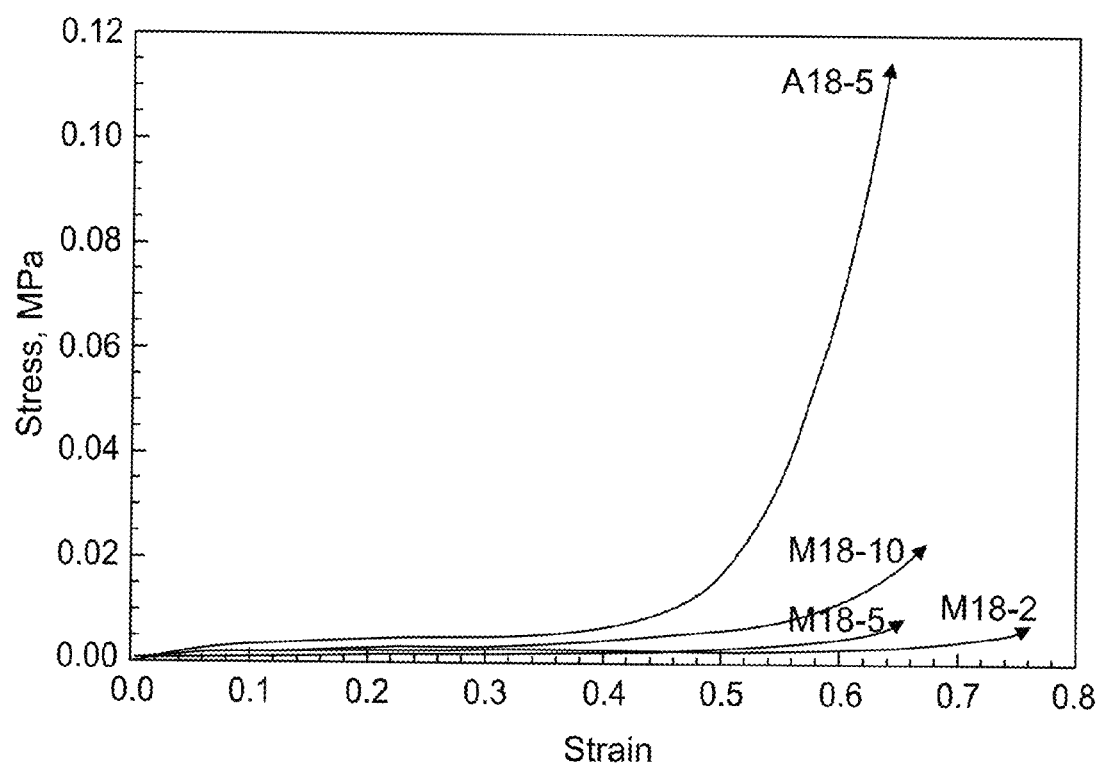

FIGS. 10A-C present comparative compressive stress-strain curves of exemplary shape-memory polyHIPEs prepared from the formulations denoted A18-5, M18-2, M18-5 and M18-10, according to some embodiments of the present invention, obtained at room temperature (FIG. 10A) and obtained at 70° C. during the first deformation and recovery cycle, with a separate y-axis for A-18 on the right hand side (FIG. 10B) and with all samples using the same y-axis (insert FIG. 10C).

Table 3 presents the Young's compressive moduli of exemplary shape-memory polyHIPEs prepared from formulations denoted A18-5, M18-2, M18-5 and M18-10, according to some embodiments of the present invention, as obtained in four deformation and recovery cycles, each denoted by a cycle number N.

TABLE 3

| PolyHIPE formulation | Modulus at RT, kPa | Modulus at 70° C., kPa | | | |
|---|---|---|---|---|---|
| | | N = 1 | N = 2 | N = 3 | N = 4 |
| A18-5 | 8424 | 35 | 24 | 17 | 26 |
| M18-2 | 3342 | 14 | 5 | 6 | 5 |
| M18-5 | 4780 | 17 | 9 | 10 | 21 |
| M18-10 | 3373 | 23 | 10 | 6 | 14 |

As can be seen in FIGS. 10A-C and Table 3, a similar dependence of modulus on temperature is observed in the compressive stress-strain tests for all samples. At room temperature the polyHIPEs have moduli of a few MPa, similar to the conventionally crosslinked polyHIPEs (FIG. 10A and Table 3). The polyHIPEs heated to 70° C. have moduli which are two orders of magnitude lower, about a few kPa (FIG. 10B and Table 3). A18-5 has the highest modulus at RT, which is attributed to its higher degree of crystallinity (Table 2 and Table 3).

A18-5 also has the highest modulus at 70° C. This may indicate a higher residual crystallinity content in the polymer with the higher Tm.

Imaging Deformation and Recovery:

FIGS. 12A-B are SEM micrographs of a sample of an exemplary shape-memory polyHIPE M18-5, according to some embodiments of the present invention, after being heated to 70° C. and then either deformed to about 30 percent followed by cooling to room temperature (FIG. 12A) or deformed to about 65 percent followed by cooling to room temperature (FIG. 12B).

As can be seen in FIG. 12A, after about 30 percent deformation the polyHIPE voids are still relatively spherical and the individual voids are identifiable, and only slightly flattened.

As can be seen in FIG. 12B, after about 65 percent deformation the polyHIPE voids are flattened and it is difficult to identify individual voids.

FIG. 12 presents a plot of the recovery ratio as a function of deformation as measured for exemplary shape-memory poly-HIPE M18-5, according to some embodiments of the present invention, following the first cycle of deformation and recovery.

As can be seen in FIG. 12, up to a deformation level of 50 percent (inclusive) the recovery is about 100 percent. For deformations of 65 percent and above the recovery was lower than 100 percent and decreased with increasing deformation.

Measuring Deformation and Recovery:

Deformation and recovery cycles were performed at about 70 percent deformation for some exemplary shape-memory polyHIPEs, according to some embodiments of the present invention.

The shape fixity ratios, for all the polyHIPEs in all the deformation and recovery cycles, were about 100 percent.

FIGS. 13A-D present four plots of recovery ratio as a function of temperature, measured in four deformation and recovery cycles (denoted by N=1, 2, 3 and 4) for the exemplary shape-memory polyHIPE samples A18-5 (FIG. 13A), M18-2 (FIG. 13B), M18-5 (FIG. 13C) and M18-10 (FIG. 13D), deformed to about 70 percent.

Table 4 presents average shape recovery ($R_r$) ratios of four exemplary shape-memory polyHIPEs, measured in four deformation and recovery cycles.

TABLE 4

| $R_r$, % | N = 1 | N = 2 | N = 3 | N = 4 |
|---|---|---|---|---|
| A18-5 | 82.6 | 91.6 | 91.9 | 90.5 |
| M18-2 | 86.8 | 86.9 | 99.0 | 98.3 |
| M18-5 | 92.2 | 95.0 | 88.6 | 97.5 |
| M18-10 | 78.6 | 55.4 | 47.5 | 56.3 |

As can be seen in Table 4, A18-5, M18-2 and M18-5 exhibited shape recovery $R_r$, from 82.6 to 99.0 percent. In general, $R_r$ tends to increase with increasing cycle number.

As can be seen in FIG. 13A, A18-5 exhibits a two-stage recovery behavior. Recalling that the DSC curve of A18-5 exhibited two melting temperatures (see, FIG. 7A), it is possible that the two different recovery temperatures indicate two different types of crystalline phases.

Figure 14A:
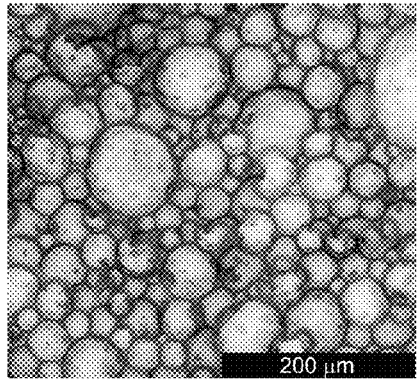
FIGS. 14A-H are SEM micrographs after four deformation and recovery cycles of exemplary shape-memory polyHIPE A18-5 (FIGS. 14A-B), M18-2 (FIGS. 14C-D), M18-5 (FIGS. 14E-F) and M18-10 (FIGS. 14G-H)
Figure 14B:
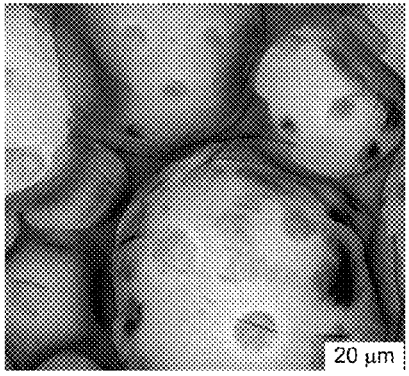
Figure 14C:
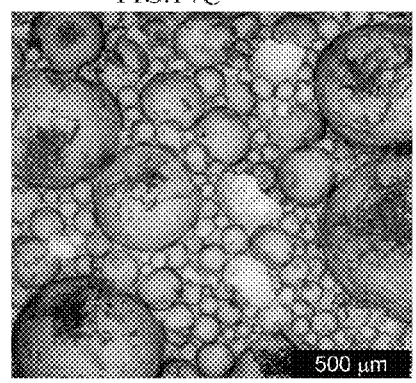
Figure 14D:
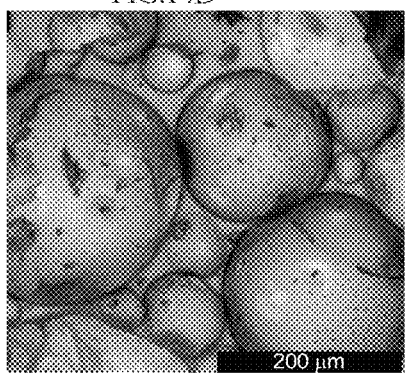
Figure 14E:
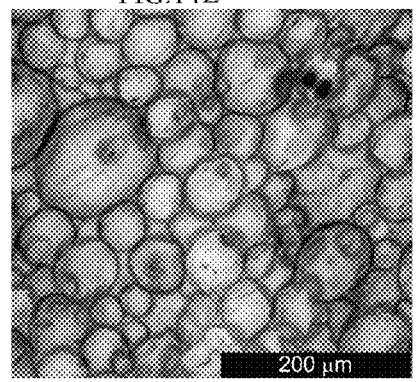
Figure 14F:
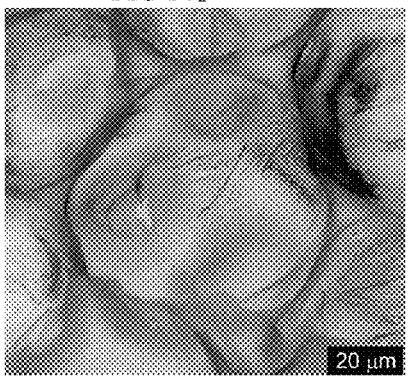
Figure 14G:
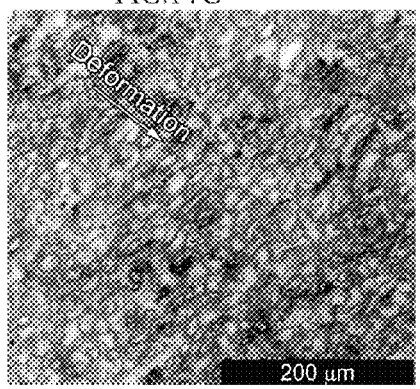
Figure 14H:
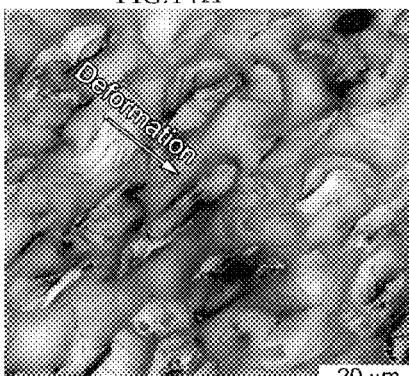

FIGS. 14A-H are SEM micrographs after four deformation and recovery cycles of exemplary shape-memory polyHIPE A18-5 (FIGS. 14A-B), M18-2 (FIGS. 14C-D), M18-5 (FIGS. 14E-F) and M18-10 (FIGS. 14G-H).

Comparing FIG. 14 to FIG. 5, it may be concluded that A18-5, M18-2 and M18-5 recovered their shapes both on the macroscopic scale and on the microscopic scale during the deformation and recovery cycles.

Figure 15:
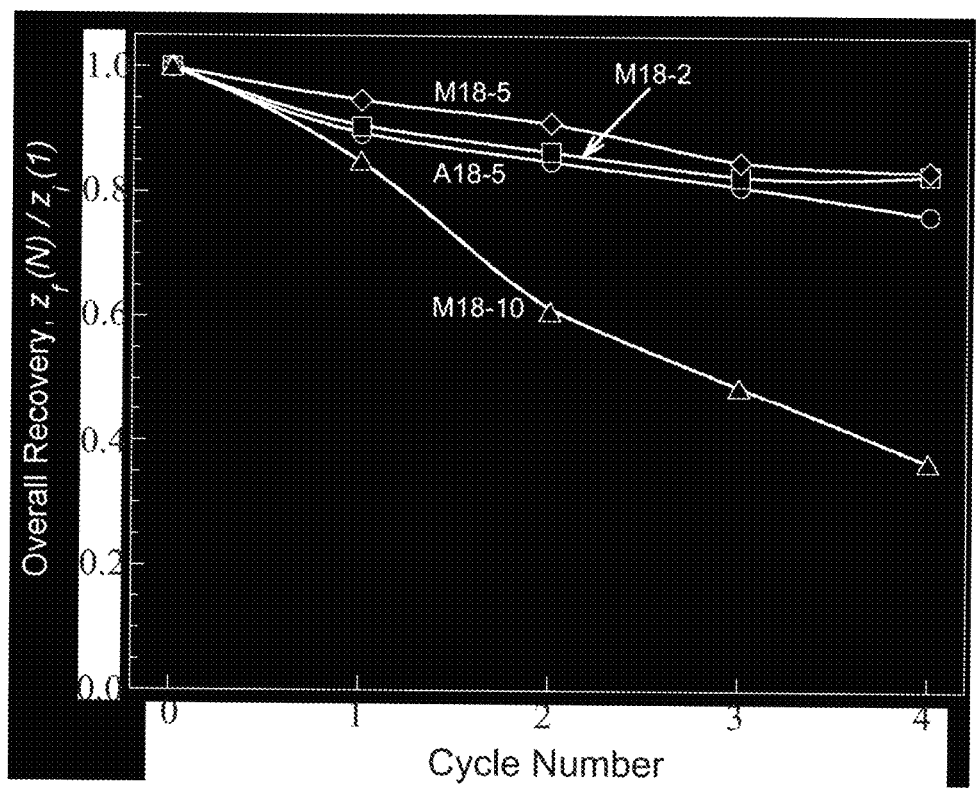
FIG. 15 presents a plot of the overall recovery (sample length following deformation and recovery cycle N normalized by the initial length before the first deformation and recovery cycle, $z_i(N)/Z_i(1)$) as a function of the cycle number, measured for exemplary shape-memory polyHIPEs prepared from formulations denoted A18-5, M18-2, M18-5 and M18-10, according to some embodiments of the present invention.

FIG. 15 presents a plot of the overall recovery (sample length following deformation and recovery cycle N normalized by the initial sample length before the first deformation and recovery cycle $z_f(N)/Z_f(1)$) as a function of the cycle number, measured for exemplary shape-memory polyHIPEs prepared from formulations denoted A18-5, M18-2, M18-5 and M18-10, according to some embodiments of the present invention.

Figure 13:
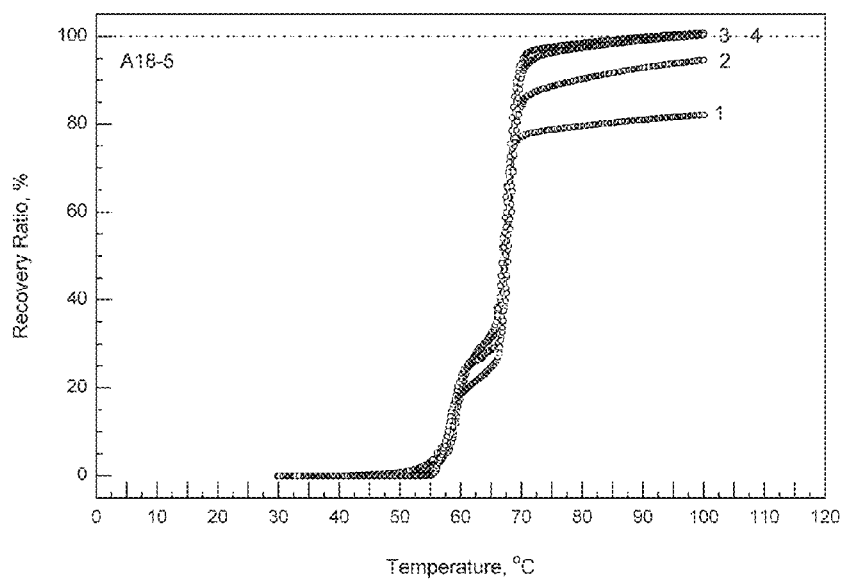
FIGS. 13A-D present four plots of recovery ratios as a function of temperature, as measured in four deformation and recovery cycles (denoted by N=1, 2, 3 and 4) for the exemplary shape-memory polyHIPE sample A18-5 (FIG. 13A), M18-2 (FIG. 13B), M18-5 (FIG. 13C) and M18-10 (FIG. 13D), deformed to about 70 percent.
Figure 13:
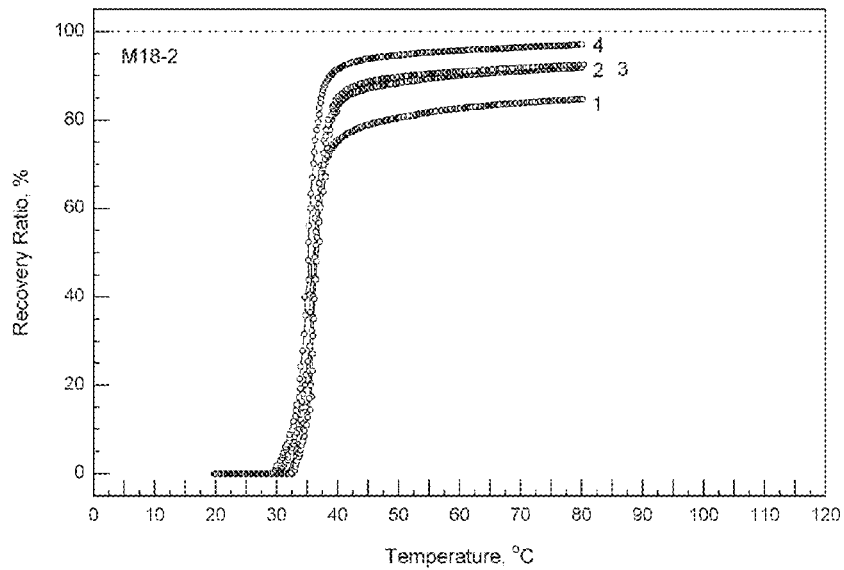
Figure 13C:
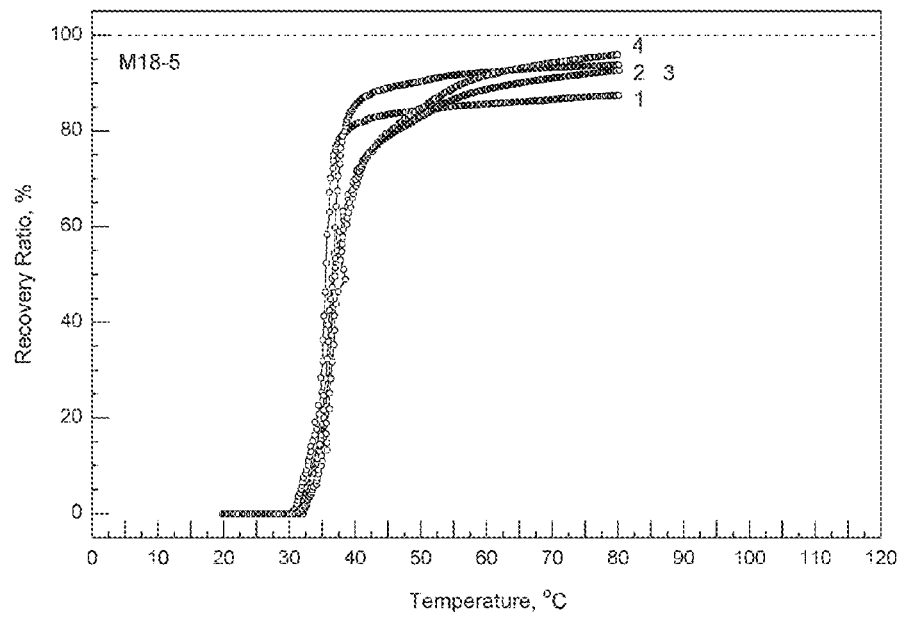
Figure 13D:
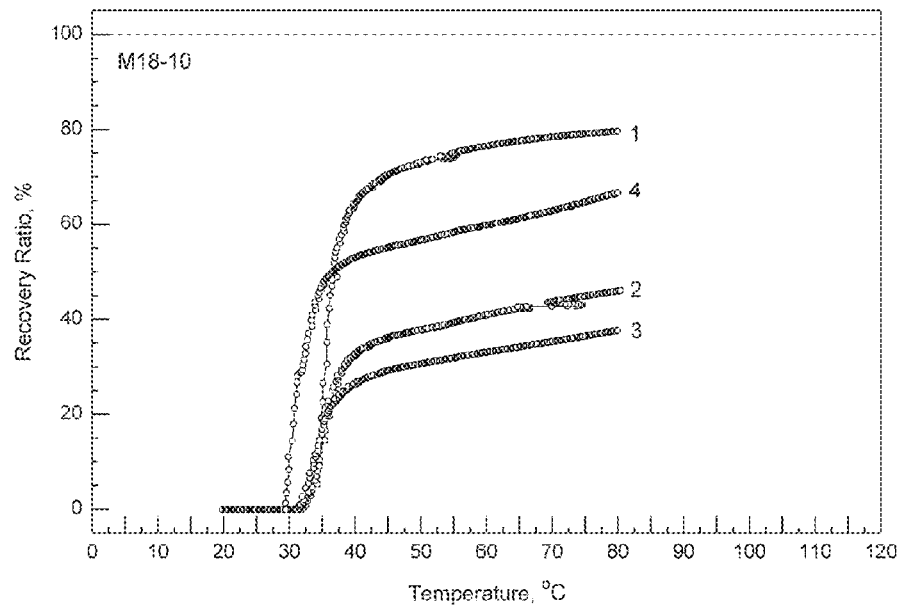

As can be seen in FIG. 15, sample M18-10 exhibited a limited recovery (see also, FIG. 13D and Table 4). The decrease in overall recovery with cycle number is indicative of an accumulation of unrecovered plastic deformation The overall unrecovered plastic strain in M18-10 during four deformation and recovery cycles is 0.63, while those in the other polyHIPEs ranged from 0.17 to 0.24 (FIG. 15).

FIGS. 14G-H shows the structure of M18-10 following 4 cycles. This structure is similar to the structure of M18-5 which was cooled to room temperature under 65 percent deformation (see, FIG. 11B).

The conjecture stemming from the results obtained for M18-10 is that the thicker, more densely packed nanoparticle assembly at the solid-gas interface, as defined hereinabove, undergoes some inter-particle plastic deformation that interferes with the recovery of the polymer above the Tm, and, therefore, samples such as M18-10 exhibit SM characteristics to a lesser degree compared to equivalent samples made with lower modified NP contents.

Deformation and Recovery Times:

As can be seen from FIG. 13, the recovery temperatures were higher than the melting temperatures measured in DSC. This difference may reflect the poor heat conductivity within the polyHIPEs whose temperatures may be significantly lower than the temperature of the surrounding environment.

As can be inferred from the recovery curves presented in FIG. 13, the recovery duration was only about 10 to 15 minutes.

The porous microstructure of the shape-memory polyHIPEs, according to some embodiments of the present invention, confers the advantages of a lightweight material and the ability to sustain high compressive deformation levels, and as a result, to achieve high deformations upon recovery.

The results presented above demonstrate the advantages of HIPE-derived shape-memory polymers compared to conventional bulk shape-memory polymers.

Example 4

Shape-Memory Bicontinuous Composite Structures

Figure 16A:
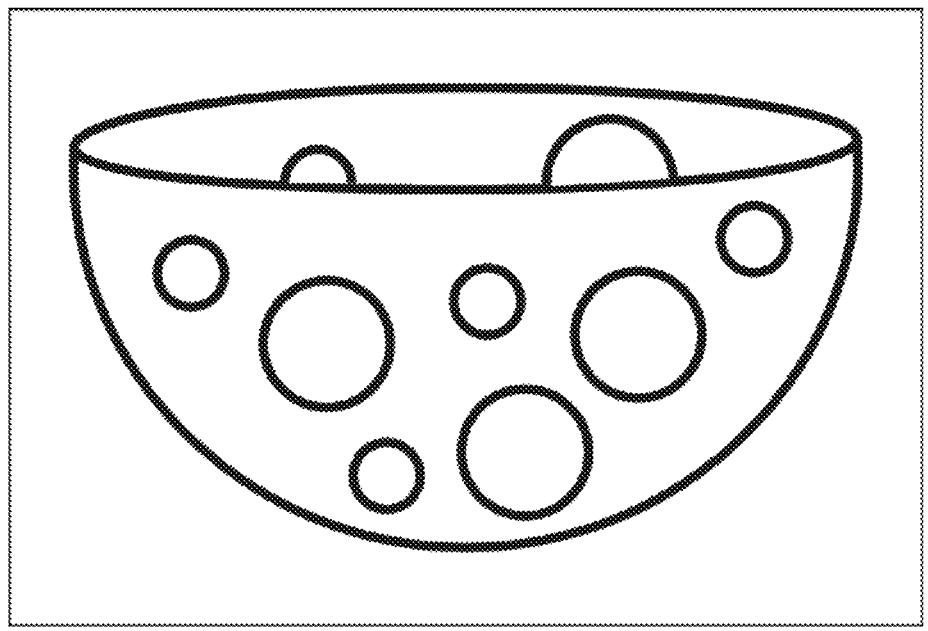
FIGS. 16A-B present a schematic illustration of a shape-memory foam according to embodiments of the present invention (FIG. 16A), and a shape-memory bicontinuous composite structure filled with hydrogel according to embodiments of the present invention (FIG. 16B)
Figure 16B:
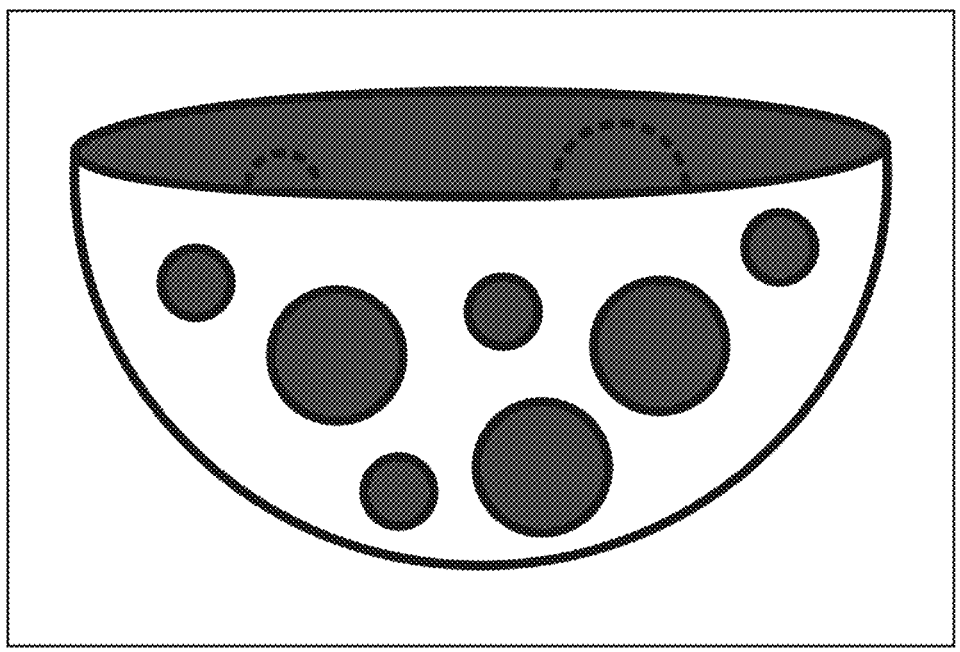

FIGS. 16A-B present a schematic illustration of a shape-memory foam according to embodiments of the present invention (FIG. 16A), and a shape-memory bicontinuous composite structure filled with hydrogel according to embodiments of the present invention (FIG. 16B).

Preparation of Shape-memory Bicontinuous Composite Structures:

As described hereinabove, shape-memory bicontinuous composite structures are produced by using essentially the same process used for forming the presently disclosed shape-memory foams, with the main difference being the presence of hydrogel-forming constituents in the internal aqueous phase of the HIPE.

An exemplary shape-memory bicontinuous composite structure was produced from the following ingredients:

The organic phase (10-15% of the HIPE) contained A18, NPs and BPO as presented in Table 1 hereinabove;

The aqueous phase (85-90% of the HIPE) contained water and $K_2SO_4$ substantially as presented in Table 1 hereinabove, as well as the exemplary hydrophilic monomer acrylamide (AAm), the exemplary hydrophilic crosslinking agent MBAM and the exemplary hydrophilic polymerization initiator agent KPS, wherein the ratio of AAm/MBAM was 10:1 molar ratio.

Other formulations which were used for producing other exemplary shape-memory bicontinuous composite structure are presented in Table 5 below.

TABLE 5

| HIPE Phase | A18-polyHIPEs component | Unfilled Wt % | PAAm Wt % | PHEMA Wt % | PHEA Wt % | PMAAc Wt % |
|---|---|---|---|---|---|---|
| External organic phase | A18 (hydrophobic monomer) | 14.06 | 14.06 | 14.06 | 14.06 | 14.06 |
| | BPO | 0.20 | 0.20 | 0.20 | 0.20 | 0.20 |
| | Silica-NPs | 0.75 | 0.75 | 0.75 | 0.75 | 0.75 |
| | Total | 15.00 | 15.00 | 15.00 | 15.00 | 15.00 |
| Internal aqueous phase | Water | 84.58 | 81.24 | 81.51 | 81.47 | 81.35 |
| | KPS (hydrophilic initiator agent) | 0.00 | 0.02 | 0.02 | 0.02 | 0.02 |
| | $K_2SO_4$ | 0.42 | 0.42 | 0.42 | 0.42 | 0.42 |
| | Hydrophilic monomer | 0.00 | 2.72 | 2.72 | 2.72 | 2.72 |
| | MBAM (hydrophilic crosslinking agent) | 0.00 | 0.59 | 0.32 | 0.36 | 0.49 |
| | Total | 85.00 | 85.00 | 85.00 | 85.00 | 85.00 |

Microstructure of Shape-memory Bicontinuous Composite Structures:

The microstructure of the SM-BCSs presented herein is substantially similar to the of the SMP foam in terms of the elastomeric mass that stems from the organic (hydrophobic) phase, hence the shape-memory characteristics of the resulting hydrogel-filled polyHIPE (bicontinuous composite structure) is substantially similar to that of the gas-filled polyHIPE (foam).

Figure 17A:
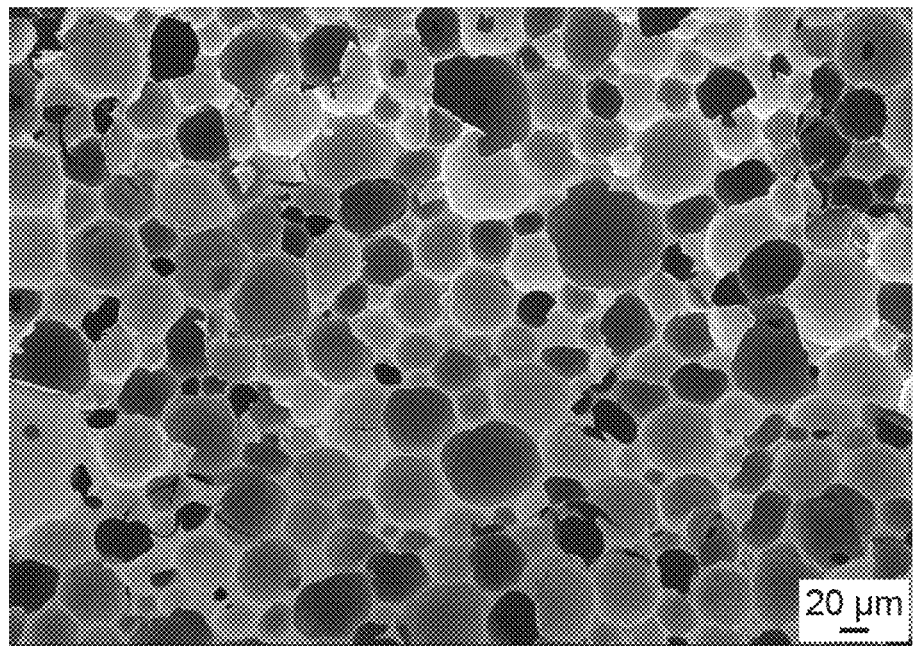
FIGS. 17A-B preset SEM micrographs of an exemplary shape-memory bicontinuous composite structure filled with hydrogel at two magnifications, showing the hydrogel-coated inner surface of the closely-packed spheroids making the quasi-closed cell microstructure.
Figure 17B:
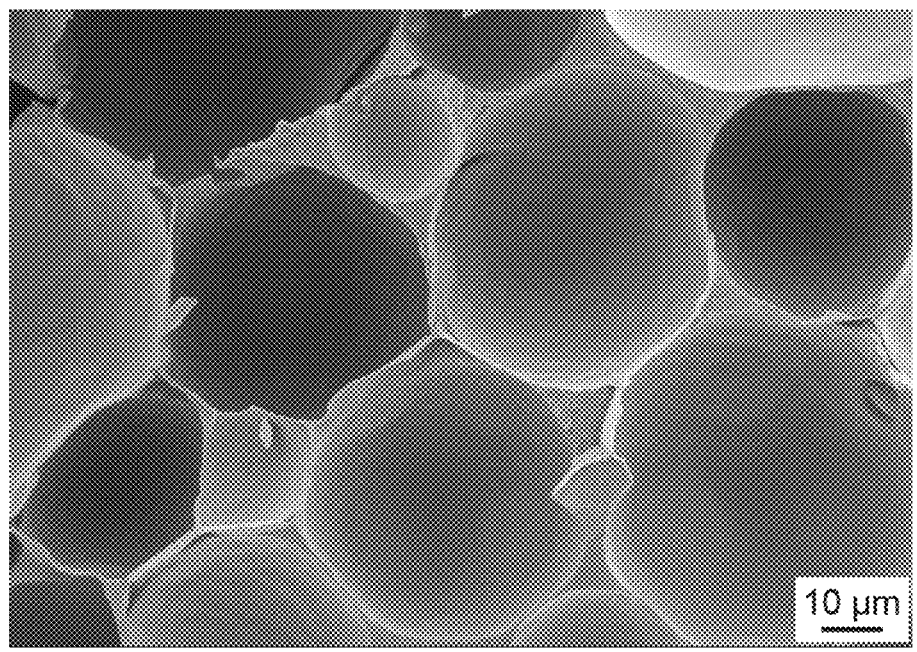

FIGS. 17A-B preset SEM micrographs of an exemplary shape-memory bicontinuous composite structure filled with hydrogel at two magnifications, showing the hydrogel-coated inner surface of the closely-packed spheroids making the quasi-closed cell microstructure.

The presently disclosed SM-BCSs can be hydrated and dehydrated reversibly, namely absorb aqueous media by swelling of the hydrogel.

Figure 18A:
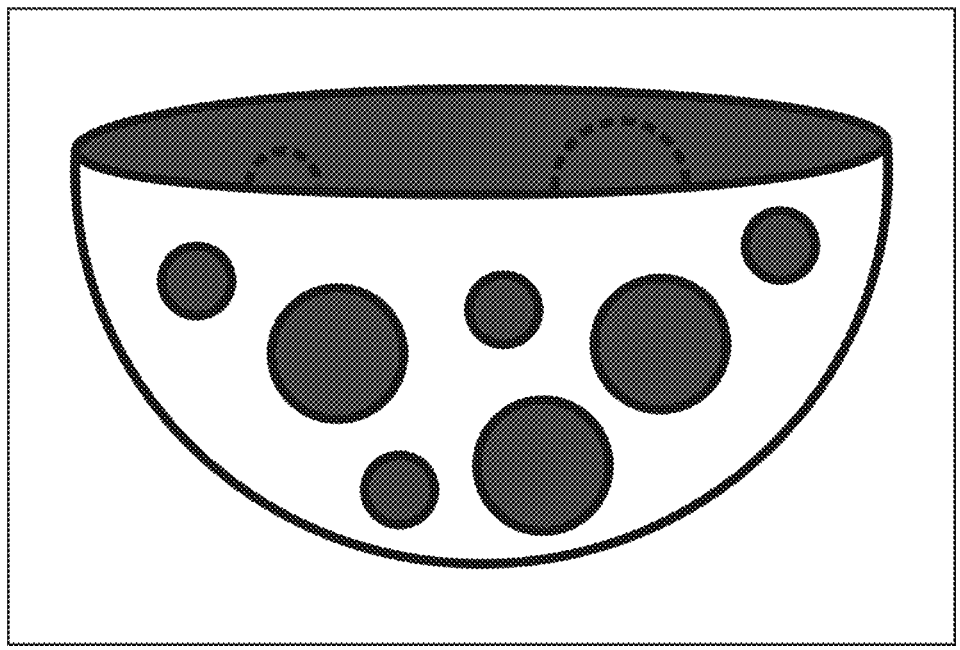
FIGS. 18A-B preset a schematic illustration of one cell in a BCS where the hydrogel in the cell is fully hydrated (FIG. 18A) and where the hydrogel in the cell is dehydrated (FIG. 18B)
Figure 18B:
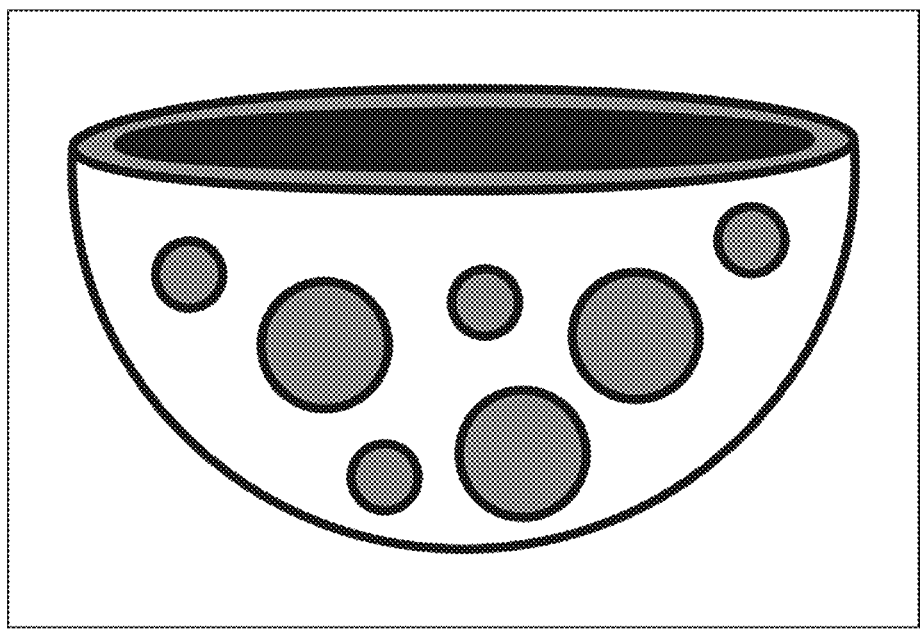

FIGS. 18A-B preset a schematic illustration of one cell in a BCS where the hydrogel in the cell is fully hydrated (FIG. 18A) and where the hydrogel in the cell is dehydrated (FIG. 18B).

It is assumed that the dehydrated hydrogel shrinks to a layer that covers the inner walls of the cells, and essentially blocking the interconnecting passages between the cells, as can be seen in the schematic illustration of FIG. 18B.

Figure 19:
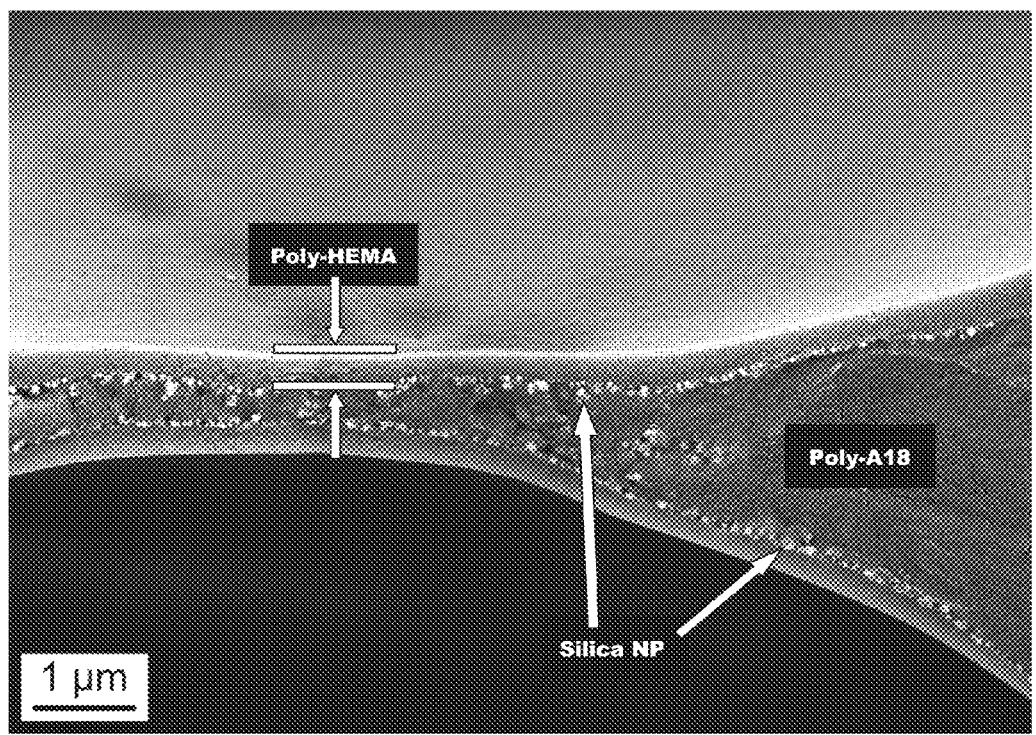
FIG. 19 presents a SEM micrograph of a dehydrated sample of a shape-memory bicontinuous composite structure according to some embodiments of the present invention, prepared with stearyl acrylate (A18) monomers and silica NP in the organic phase and hydroxyethyl methacrylate (HEMA) monomers in the aqueous phase.

FIG. 19 presents a SEM micrograph of a dehydrated sample of a shape-memory bicontinuous composite structure according to some embodiments of the present invention, prepared with stearyl acrylate (A18) monomers and silica NP in the organic phase and hydroxyethyl methacrylate (HEMA) monomers in the aqueous phase.

As can be seen in FIG. 19, the resulting in a bicontinuous composite structure exhibits a thin wall separating two spheroid cells, wherein the silica NPs are located between the elastomeric PA18 and the dehydrated PHEMA hydrogel, whereas the hydrogel appears as a layer having a thickness of about 200 nm thick that coats the inner PA18 surface of the cell at what was the oil-water interface before polymerization of the HIPE and dehydration of the hydrogel.

Mechanical Properties of SM-BCSs:

Table 6 presents some mechanical properties of exemplary SM-BCSs prepared with A18 hydrophobic monomers in the organic phase and different hydrophilic monomers in the aqueous phase, compared to the equivalent SMP foam (unfilled).

TABLE 6

| PA18-based-polyHIPE | Polymerization yield % | Density (ρ) g/cm³ | Average cell size μm | Gel Content (CG) % | $T_m$ °C. | $X_c$ % |
|---|---|---|---|---|---|---|
| Unfilled | 93.8 | 0.15 | 44.3 | 93.7 | 49.8 | 55.6 |
| PAAm | 83.2 | 0.21 | 40.8 | 95.3 | 46.45 | 41.7 |
| PHEMA | 90.9 | 0.20 | 32.4 | 95.4 | 47.24 | 43.9 |
| PMAAc | 86.5 | 0.20 | 41.5 | — | 46.45 | 39.3 |
| PHEA | 71.5 | 0.18 | 44.7 | 96.7 | 49.02 | 44.2 |

As can be seen in Table 6, SM-BCSs according to embodiments of the present invention, are substantially similar to SMP foams according to embodiments of the present invention, while the presence of the hydrogel yields a decrease in crystallinity Xc which leads to a small decrease in the Tm, and the elasticity modulus of the hydrogel-filled-polyHIPEs is affected by the presence of the hydrogel.

Figure 20:
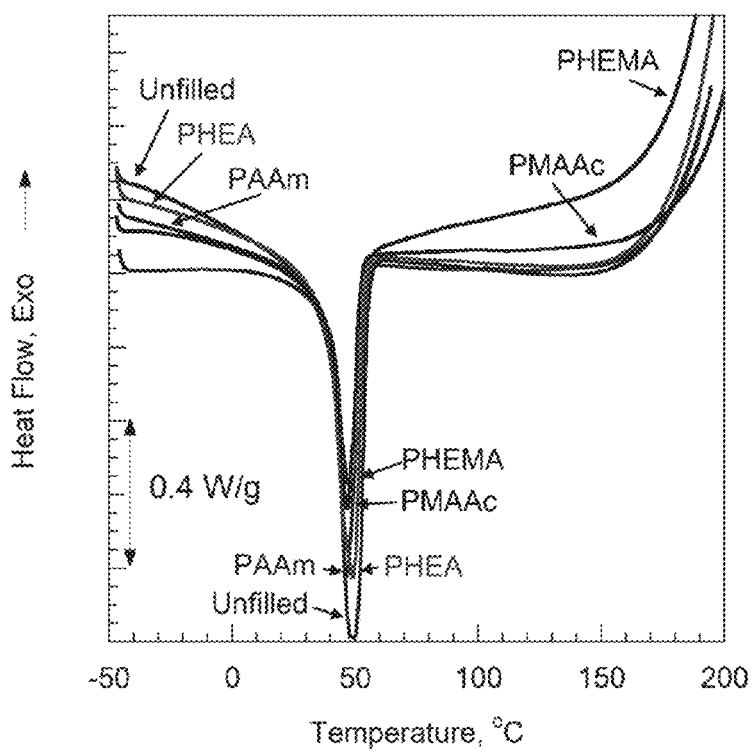
FIG. 20 presents a comparative plot, showing the heat flow as a function of the temperature and demonstrating the crystalline nature of the external phase polymer for exemplary SM-BCSs and one exemplary SMP foam according to embodiments of the present invention, based on various hydrophilic monomers for forming the hydrogel and all based on A18 hydrophobic monomers.

Shape-memory Parameters of SM-BCSs:

FIG. 20 presents a comparative plot, showing the heat flow as a function of the temperature for exemplary SM-BCSs and an exemplary SMP foam according to embodiments of the present invention, based on various hydrophilic monomers for forming the hydrogel and all based on A18 hydrophobic monomers, and demonstrating the crystalline nature of the external phase polymer while providing the data for the Tm and Xc determination presented herein.

Table 7 presents parameters pertaining to the shape-memory response of exemplary SM-BCSs according to embodiments of the present invention, wherein the water uptake (WU) is defined in Equation 4, wherein $M_i$ is the samples mass before deformation, $M_u$ is the sample's mass after deformation and temporary shape fixation for a hydrated sample, and $M_f$ is the mass of a fully hydrated sample after shape recovery.

$$WU = \frac{M_f - M_u}{M_i - M_u}. \quad \text{Equation 4}$$

TABLE 7

| Sample | Shape fixity ratio ($R_f$) % | Shape recovery ratio ($R_r$) % | Water uptake (WU) % |
|---|---|---|---|
| Unfilled | 100 | 79.3 | 2.92 |
| PAAm | 100 | 86.7 | 31.3 |
| PHEMA | 100 | 100.0 | 77.5 |
| PMAAc | 100 | 99.3 | 83.4 |
| PHEA | 100 | 76.1 | 22.8 |

As can be seen in Table 7, the SM-BCSs (hydrogel-filled-polyHIPEs) exhibited complete recovery in hot water that was superior to the recovery of the unfilled polyHIPE under similar shape-memory response measurements. The shape fixity ratio ($R_f$) of exemplary SM-BCSs for a compressive strain of 70 percents were 100 percents, and SM-BCSs exhibited one-stage recovery, with PHEMA-filled polyHIPEs exhibiting full one-stage recovery.

As can also be seen in Table 7, the unfilled polyHIPE sample (SMP foam) exhibited relatively poor recovery in hot water, below 80%. The hydrophobic unfilled SMP foam was not wet by water and thus exhibited poor absorption of the hot water. The PMAAc- and PHEMA-filled SMP-BCSs exhibited superior water absorption and thus superior recovery in hot water.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A shape-memory bicontinuous composite structure comprising a continuous polymeric porous solid matrix composed of a plurality of backbone chains and a continuous hydrogel filling the pores in said continuous polymeric porous solid matrix, wherein at least a portion of said backbone chains comprising a plurality of side-chain moieties, said plurality of backbone chains is arranged such that said plurality of side-chain moieties is capable of forming a crystalline structure, and wherein at least a portion of said backbone chains are crosslinked substantially at a matrix-hydrogel interface of the structure.

2. The structure of claim 1, being such that when said hydrogel is hydrated and the structure is deformed by an external stress at a temperature above the melting temperature (Tm) of said matrix, and the temperature is then lowered below said Tm while maintaining said stress, the structure substantially retains its deformed shape.

3. The structure of claim 2, being such that when said stress is ceased and the temperature is then raised above said Tm, the structure substantially recovers to its original shape.

4. The structure of claim 2, wherein at least a portion of said side-chain moieties form said crystalline structure below said Tm.

5. The structure of claim 1, being produced by subjecting a high internal phase emulsion (HIPE) having a polymerizable external phase and a jellifiable internal phase to polymerization of said external phase and jellification of said internal phase.

6. The structure of claim 1, having a microstructure based on the external phase of an emulsion.

7. The structure of claim 6, wherein said microstructure is a quasi-closed-cell microstructure.

8. The structure of claim 7, wherein an average cell diameter in said quasi-closed-cell microstructure ranges from 1 μm to 500 μm.

9. A process of preparing a shape-memory bicontinuous composite structure, the process comprising subjecting a high internal phase emulsion (HIPE) having a jellifiable internal aqueous phase and an organic polymerizable external phase to jellification of said jellifiable internal aqueous phase and polymerization and crosslinking of said polymerizable external phase, said jellifiable internal aqueous phase comprising at least one hydrophilic monomer, a hydrophilic crosslinking agent and a hydrophilic initiation agent, said organic polymerizable external phase comprising at least one hydrophobic monomer having a crystallizable side-chain moiety and capable of being polymerized into a plurality of backbone chains, wherein at least a portion of said backbone chains is arranged such that said plurality of side-chain moieties is capable of forming a crystalline structure, said crosslinking is effected substantially at an interface between said polymerizable external phase and said internal phase.

10. The process of claim 9, wherein said at least a portion of said backbone chains is crosslinked substantially at said interface.

11. The process of claim 9, said aqueous internal phase and/or said organic polymerizable external phase comprises an amphiphilic emulsion stabilizer and crosslinking agent capable of crosslinking said portion of said backbone chains.

12. The process of claim 11, wherein said emulsion stabilizer is a plurality of modified particles or nanoparticles having a plurality of polymerizable moieties attached thereon.

13. The process of claim 12, wherein said emulsion stabilizer is a plurality of modified silica nanoparticles.

14. A shape-memory bicontinuous composite structure prepared by the process of claim 6.

15. An article-of-manufacturing comprising the structure of claim 1.

* * * * *